(12) United States Patent
Ledvina et al.

(10) Patent No.: US 12,015,670 B2
(45) Date of Patent: *Jun. 18, 2024

(54) USING IN-HOME LOCATION AWARENESS

(71) Applicant: Apple Inc., Cupertino, CA (US)

(72) Inventors: Brent M. Ledvina, San Francisco, CA (US); Kevin P. McLaughlin, Waikoloa, HI (US); David R. Stites, San Jose, CA (US); Jahshan A. Bhatti, Campbell, CA (US); Kevin Duffy, San Jose, CA (US); Robert William Mayor, Half Moon Bay, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/101,382

(22) Filed: Jan. 25, 2023

(65) Prior Publication Data
US 2023/0164222 A1    May 25, 2023

Related U.S. Application Data

(63) Continuation of application No. 16/892,207, filed on Jun. 3, 2020, now Pat. No. 11,575,752, which is a
(Continued)

(51) Int. Cl.
*H04L 67/12* (2022.01)
*G01S 5/00* (2006.01)
(Continued)

(52) U.S. Cl.
CPC ............ *H04L 67/125* (2013.01); *G01S 5/013* (2020.05); *G01S 11/06* (2013.01); *G08C 17/02* (2013.01);
(Continued)

(58) Field of Classification Search
CPC .... H04L 67/125; H04Q 9/00; H04Q 2209/40; H04W 4/023; H04W 4/12
(Continued)

(56) References Cited

U.S. PATENT DOCUMENTS 2,905,967 A    9/1959  Hensgen et al.
6,323,807 B1   11/2001 Golding et al.
(Continued)

FOREIGN PATENT DOCUMENTS

AU    2013272113    6/2016
EP    2905967       8/2015
(Continued)

OTHER PUBLICATIONS

U.S. Appl. No. 15/612,716, "First Action Interview Pilot Program Pre-Interview Communication", dated Feb. 28, 2018, 4 pages.
(Continued)

*Primary Examiner* — Omar Casillashernandez
(74) *Attorney, Agent, or Firm* — Kilpatrick Townsend & Stockton LLP

(57) ABSTRACT

Techniques for suggesting accessory devices controlled by an application executing on a mobile device are disclosed. A method includes measuring one or more sensor values using one or more sensors of a mobile device and the one or more sensor values are determined from one or more signals emitted by a first one or more accessory devices. An area of a physical space for the first one or more accessory devices can be determined based on the one or more sensor values. A second one or more accessory devices associated with the same area as the first one or more accessory devices can be suggested to a user.

20 Claims, 10 Drawing Sheets

Related U.S. Application Data continuation of application No. 16/143,210, filed on Sep. 26, 2018, now Pat. No. 10,681,141, which is a continuation of application No. 15/612,716, filed on Jun. 2, 2017, now Pat. No. 10,091,303.

(60) Provisional application No. 62/349,021, filed on Jun. 12, 2016.

(51) Int. Cl.

| | | |
|---|---|---|
| *G01S 11/06* | (2006.01) | |
| *G08C 17/02* | (2006.01) | |
| *H04L 12/28* | (2006.01) | |
| *H04L 67/125* | (2022.01) | |
| *H04Q 9/00* | (2006.01) | |
| *H04W 4/02* | (2018.01) | |
| *H04W 4/12* | (2009.01) | |

(52) U.S. Cl.
CPC ........... *H04L 12/2809* (2013.01); *H04Q 9/00* (2013.01); *G08C 2201/20* (2013.01); *G08C 2201/34* (2013.01); *G08C 2201/91* (2013.01); *G08C 2201/92* (2013.01); *G08C 2201/93* (2013.01); *H04L 2012/2841* (2013.01); *H04L 2012/285* (2013.01); *H04Q 2209/40* (2013.01); *H04W 4/02* (2013.01); *H04W 4/023* (2013.01); *H04W 4/12* (2013.01)

(58) Field of Classification Search
USPC .................................................. 340/870.07
See application file for complete search history.

(56) References Cited

U.S. PATENT DOCUMENTS

| | | | |
|---|---|---|---|
| 7,979,426 B2* | 7/2011 | Jeong | G06F 16/337 707/723 |
| 8,412,237 B1 | 4/2013 | Ohme | |
| 8,428,754 B2* | 4/2013 | Wong | G08G 1/04 700/20 |
| 8,620,624 B2 | 12/2013 | Skibiski et al. | |
| 8,666,373 B2 | 3/2014 | Dessouky et al. | |
| 8,719,198 B2 | 5/2014 | Zheng et al. | |
| 8,774,831 B2 | 7/2014 | Ziskind et al. | |
| 8,958,820 B2 | 2/2015 | Weiss | |
| 9,084,003 B1 | 7/2015 | Sanio et al. | |
| 9,113,300 B2 | 8/2015 | Marti et al. | |
| 9,253,605 B2 | 2/2016 | Alizadeh-Shabdiz et al. | |
| 9,274,512 B1 | 3/2016 | Zima | |
| 9,824,568 B2* | 11/2017 | Hall | H04W 12/126 |
| 10,091,303 B1 | 10/2018 | Ledvina et al. | |
| 10,117,046 B2 | 10/2018 | Ledvina et al. | |
| 10,200,810 B2 | 2/2019 | Ledvina et al. | |
| 10,388,135 B1* | 8/2019 | Jordan | G08B 13/22 |
| 10,681,141 B2 | 6/2020 | Ledvina et al. | |
| 10,945,190 B2 | 3/2021 | Palmer et al. | |
| 2008/0263024 A1 | 10/2008 | Landschaft et al. | |
| 2011/0066682 A1* | 3/2011 | Aldunate | H04L 67/75 709/204 |
| 2013/0122935 A1 | 5/2013 | Das et al. | |
| 2013/0208952 A1* | 8/2013 | Auchinleck | G06V 30/242 382/115 |
| 2013/0252637 A1 | 9/2013 | Cha et al. | |
| 2013/0316734 A1 | 11/2013 | Weiss | |
| 2013/0325856 A1 | 12/2013 | Soto Matamala et al. | |
| 2013/0331087 A1* | 12/2013 | Shoemaker | H04W 4/027 455/420 |
| 2014/0207869 A1* | 7/2014 | Savolainen | G06F 9/4843 709/204 |
| 2014/0213298 A1 | 7/2014 | Marti et al. | |
| 2015/0026329 A1* | 1/2015 | Apte | H04W 4/029 709/223 |
| 2015/0035084 A1 | 2/2015 | Li et al. | |
| 2015/0094825 A1* | 4/2015 | Kinoshita | G05B 19/418 700/19 |
| 2015/0350841 A1 | 12/2015 | Dal Santo et al. | |
| 2016/0029176 A1 | 1/2016 | Marti et al. | |
| 2016/0057569 A1 | 2/2016 | Soto Matamala et al. | |
| 2016/0165566 A1 | 6/2016 | Jung | |
| 2016/0202677 A1* | 7/2016 | Trundle | G05B 15/02 700/275 |
| 2016/0232167 A1* | 8/2016 | Ham | H04L 67/52 |
| 2017/0006430 A1 | 1/2017 | Chao et al. | |
| 2017/0026987 A1* | 1/2017 | Velu | H04W 72/569 |
| 2017/0124478 A1 | 5/2017 | Baradaran et al. | |
| 2017/0272181 A1 | 9/2017 | Gudi et al. | |
| 2018/0242430 A1* | 8/2018 | Gopal Samy | H05B 47/175 |
| 2019/0188766 A1* | 6/2019 | Cho | G06T 15/50 |

FOREIGN PATENT DOCUMENTS

| | | |
|---|---|---|
| WO | 2013147725 | 10/2013 |
| WO | 2016083937 | 6/2016 |
| WO | 2017218163 | 12/2017 |
| WO | 2017218164 | 12/2017 |

OTHER PUBLICATIONS

U.S. Appl. No. 15/612,716 , "Notice of Allowance", dated Jun. 1, 2018, 8 pages.
U.S. Appl. No. 16/143,210 , "Corrected Notice of Allowability", dated Apr. 27, 2020, 2 pages.
U.S. Appl. No. 16/143,210 , "First Action Interview Office Action Summary", dated Nov. 4, 2019, 6 pages.
U.S. Appl. No. 16/143,210 , "First Action Interview Pilot Program Pre-Interview Communication", dated Sep. 11, 2019, 4 pages.
U.S. Appl. No. 16/143,210 , "Notice of Allowance", dated Jan. 30, 2020, 10 pages.
U.S. Appl. No. 16/892,207 , "Corrected Notice of Allowability", dated Oct. 7, 2022, 2 pages.
U.S. Appl. No. 16/892,207 , "Final Office Action", dated Jul. 12, 2022, 16 pages.
U.S. Appl. No. 16/892,207 , "First Action Interview Office Action Summary", dated Dec. 17, 2021, 14 pages.
U.S. Appl. No. 16/892,207 , "First Action Interview Pilot Program Pre-Interview Communication", dated Oct. 29, 2021, 16 pages.
U.S. Appl. No. 16/892,207 , "First Action Interview Pilot Program Pre-Interview Communication", dated Aug. 20, 2021, 4 pages.
U.S. Appl. No. 16/892,207 , "Notice of Allowance", dated Sep. 30, 2022, 8 pages.
Do et al., "Where and What: Using Smartphones to Predict Next Locations and Applications in Daily Life", Pervasive and Mobile Computing, vol. 12, Jun. 2014, pp. 79-91.
Xu et al., "Preference, Context and Communities: A Multi-Faceted Approach to Predicting Smartphone App Usage Patterns", Proceedings of The 17th Annual International Symposium on International Symposium on Wearable Computers, ISWC'13, Sep. 9-12, 2013, pp. 69-76.

* cited by examiner

USING IN-HOME LOCATION AWARENESS

CROSS REFERENCE TO RELATED APPLICATION

This application is a continuation of U.S. patent application Ser. No. 16/892,207 filed Jun. 3, 2020, which is continuation of U.S. patent application Ser. No. 16/143,210 filed on Sep. 26, 2018, which is a continuation of U.S. patent application Ser. No. 15/612,716, filed on Jun. 2, 2017, now U.S. Pat. No. 10,091,030, which claims priority to U.S. Provisional Patent Application No. 62/349,021, filed on Jun. 12, 2016, the disclosures of which are hereby incorporated by reference in their entirety.

BACKGROUND

An application (e.g., home application) on a device (e.g., laptop, mobile device, wearable device, etc.) may be used to control other devices, such as accessory devices (e.g., kitchen appliances, lighting fixtures, thermometer, etc.), throughout a home. A user of the home application may be in the same room as the accessory device that is controlled or may be in a different room from the accessory device that is being controlled. For example, a user may be in their kitchen when they use the home application on their mobile device to close the garage door.

Users often perform the same or repeated actions with accessory devices while in a particular location. For example, every time a user comes home from work, they may close the garage door when they are in the kitchen. In addition, when it is dark outside, the user may turn on a lamp in the living room or change a temperature on a thermometer while in the living room. Therefore, certain activities with respect to devices in a home may be performed regularly and repeatedly (e.g., daily, several times throughout a day) while the user is in a certain location. This can be a time consuming and tedious task for a user since these tasks are performed regularly or several times throughout the day.

Thus, improvements for identifying an accessory device that should be controlled upon determining a particular location of a mobile device of a user is desired. Specifically, it is desired for the home application on the mobile device to be able to determine a location of the user and suggest a corresponding accessory device that a user may want to control or automatically operate a corresponding accessory device based on the location of the mobile device of the user.

SUMMARY

Embodiments provide devices and methods for suggesting an accessory device based on a current location of a mobile device. In some embodiments, the method includes measuring one or more sensor values to determine a data point at each of a plurality of first times, associating an accessory device with each of the data points, clustering the data points within a threshold distance of each other to create a plurality of clusters. The method also includes, after clustering the data points, measuring one or more sensor values to determine one or more current data points at a second time, determining that the one or more current data points at the second time corresponds to a first cluster of the plurality of clusters, identifying a first accessory device associated with one or more of the data points in the first cluster, and providing a message using the application.

Other embodiments are directed to systems, portable consumer devices, and computer readable media associated with the methods described herein.

A better understanding of the nature and advantages of exemplary embodiments may be gained with reference to the following detailed description and the accompanying drawings.

BRIEF DESCRIPTION OF THE DRAWINGS

The disclosure will be readily understood by the following detailed description in conjunction with the accompanying drawings, wherein like reference numerals designate like elements, and in which.

TERMS

Figure 1:
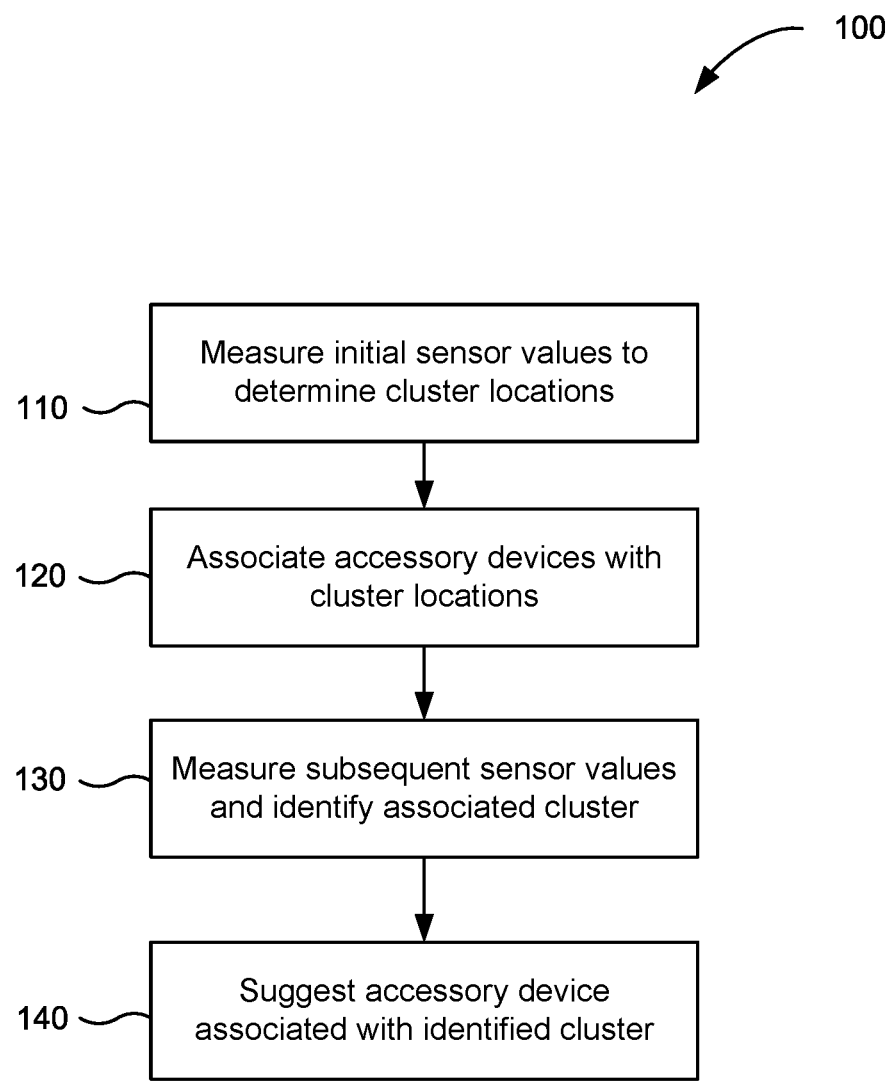
FIG. 1 illustrates a flowchart of a method for determining a location of a mobile device and identifying a corresponding accessory device to suggest to a user, in accordance with some embodiments.

An "application" can be a client application that is executed by a processor of a device (e.g., executed within an operating system) or be any part of an operating system. An application may be a specific part of the operating system designed to perform a specific function when executed by a processor. An application can be a home application in that the application can control and/or provide information regarding devices, such as accessory devices, in a home.

An "accessory device" can be a device that is in or in the vicinity of a particular environment, region or location, such as in a home, apartment or office. An accessory device can include a garage door, door locks, fans, lighting device (e.g., lamps), a thermometer, windows, window blinds, kitchen appliances, and any other devices that are configured to be controlled by an application, such as a home application. An accessory device can be determined or associated with a home by the home application. An accessory device can be determined by, for example, a mobile device automatically scanning an environment for any accessory devices, or a user may manually enter accessory device information via, for example, the home application.

A "cluster" corresponds to a group of sensor positions (e.g., single scalar data points, multi-dimensional data points, etc.) at which measurements have been made. For example, measurements may be made only when one or more events occur at a mobile device. Sensor positions can be determined to lie in a cluster according to embodiments described herein. For example, the sensor positions of a cluster can have parameters that are within a threshold distance of each other or from a centroid of a cluster. When viewed in sensor space, a cluster of sensor positions appears as a group of sensor positions that are close to one another. A cluster of sensor positions can be located, for example, in a room of a house or in a particular area (e.g., hallway, front door area) of a house. Therefore, a cluster can be used to identify locations in a home and corresponding one or more accessory devices associated with the locations.

A "controlling device" can correspond to any device that can control an accessory device. A controlling device can include mobile devices, such as, a mobile phone, a smart phone, a laptop, a tablet, a set top box and a wearable device (e.g., smart watch). These are merely examples and other devices can act as a controlling device. The controlling device can also be a television, such as a smart television, or a desktop computer. A user can have one or more controlling devices and there can be one or more controlling devices in a home. In addition, one of more controlling devices can be shared controlling devices, which are shared by multiple users in a home.

"Contextual information" refers collectively to any data that can be used to define the context of a mobile device. The contextual information for a given context can include one or more contextual data, each corresponding to a different property of the mobile device. The potential properties can belong to different categories, such as a time category (e.g., time information) or a location category. Contextual data can be used as a feature of a model (or sub-model), and the data used to train the model can include different properties of the same category. A particular context can correspond to a particular combination of properties of the mobile device, or just one property.

A "message" corresponds to data in any form of communication, which may be provided to a user via, for example, a display of a mobile device of the user or may be provided to another device accessible or visible to a user. A message can be generated by an application, such as a home application, or can include information related to an application running on a device (e.g., include a link to an application). As examples, a message may be an alert, notification, suggested application, and the like. A message does not necessarily have to include text that conveys a readable message, as the message can be to another application, and thus the message can be in binary form.

A "sensor position" corresponds to sensor values (also called parameters) measured from one or more wireless signals, which may be emitted by one or more signal sources (e.g., external devices such as networking devices, a cellular telephone signal, a WiFi network signal, a Bluetooth signal, etc.). One or more sensors of the mobile device can measure the values corresponding to the sensor position. A given measurement of the one or more wireless signals may be made one or more times over a time interval, where the measured values can correspond to a measured sensor position. Two measurements at two different times can correspond to a same sensor position. A parameter corresponding to a sensor position may be zero if a particular wireless signal is not measured, or be a nominal value such as −110 dB, or have an associated large uncertainty. A sensor position may be represented by a multi-dimensional data point (vector) that includes measured values of the one or more wireless signals, potentially from a plurality of external devices. In various embodiments, a parameter of a wireless signal can be a signal property (e.g., signal strength or time-of-flight, such as round trip time (RTT)), or other sensor values measured by a sensor of a mobile device, e.g., relating to data conveyed in the one or more wireless signals.

A "user interface" corresponds to any interface for a user to interact with a device. A user interface for an application allows for a user to interact with the application. The user interface could be an interface of the application when the application is running on a user's mobile device. As another example, the user interface can be a system interface that provides a reduced set of accessory devices for users to select from, thereby making it easier for a user to use accessory devices.

DETAILED DESCRIPTION

In the following description, for the purposes of explanation, specific details are set forth in order to provide a thorough understanding of the exemplary embodiments. However, it will be apparent that various embodiments may be practiced without these specific details. The figures and description are not intended to be restrictive.

In an example embodiment, a mobile device can generate clusters of sensor positions and identify one or more accessory devices associated with the clusters of sensor positions. Based on the determined associations, when, at a later time, a user is at a determined location according to detected sensor information, one or more associated accessory devices can be suggested to a user, thereby enhancing a user's experience. Also, rooms and accessory devices associated with the room can be suggested to a user. In addition, scenes and accessory devices associated with the scenes can be suggested to the user. The suggestions regarding accessory devices and scenes can be learned or can be rule based.

When a user is located at, for example, an area around their front door, they may use the home application to control an accessory device associated with a basement door, such as a basement door lock. The home application provides the user with, for example, a visual display regarding the status of the basement door. If the basement door is not locked, then the user can control the accessory device via the application. If the basement door is locked, the user will be notified or a status can indicate that the basement door is locked. A user may perform this action of searching for a particular accessory device via the home application and determining its status every day or several times a day, such as every time they leave their home. In addition, more than one user in the home may perform this action when they are standing at the front door. This action can be performed repeatedly by one user or multiple users in a home. Thus, identifying an accessory device that a user may want to control without requiring user input to identify and access the accessory device is desired.

Specifically, it would be beneficial if the one or more users did not have to perform the actions of accessing the home application and locating one or more accessory devices to control or set values for while they are in a particular location. The controlling and/or setting values of one or more accessory devices can be referred to as creating a "scene". For example, in order to create a scene, a plurality of accessory devices can be controlled to one or more predetermined values. For example, a scene can include "movie night," "good morning," and good night." The scene "movie night" can include adjusting the lights (e.g, turn on, turn off, dim, etc.) in several rooms or areas of the house and turning on a television. The scene "good morning" can include opening window blinds and adjusting a thermostat, and a scene "good night" can include shutting window blinds and adjusting a thermostat. Therefore, a plurality of devices can be controlled in order to create a particular scene. It would be beneficial if accessory devices and/or scenes can be automatically suggested to a user based on their current location or if an accessory device is automatically controlled based on a current location of the mobile device based on the user's history of activity with an accessory device.

Therefore, in an example embodiment, an accessory device that a user may want to control can be predicted based on a current location of the mobile device and suggested to a user. Alternatively, an accessory device that a user may want to control can be predicted based on a current location of the mobile device and can be automatically operated. When an accessory device is identified, the user can be provided with a message or notification regarding the suggested accessory device. In addition, based on a user's predetermined preferences, a suggested accessory device can be automatically operated after the accessory device is identified as corresponding to a location of the mobile device.

Based on a current location of a mobile device in, for example, a home, an application, such as a home application, installed on the mobile device and configured to control accessory devices in the home can determine one or more accessory devices associated with a user's location that a user may want to control. The home application installed on the mobile device can determine an accessory device to be controlled based on information that has been previously determined and analyzed. The home application can be used to control one or more accessory devices that are registered to be controlled by the home application. Alternatively, when the accessory devices are provided to the user, the user may merely determine the status of the accessory device and may not control, operate or perform any action with the accessory device and may merely determine the status of an accessory device.

In accordance with some embodiments, accessory devices can be automatically suggested to a user based on their location, thereby easing the process of operating and/or determining the status of accessory devices.

I. Predict Accessory Device According to Location

Embodiments can control or provide control to an accessory device according to a location of a mobile device detected by sensors of the mobile device. Therefore, an accessory device can be suggested to a user without requiring the user to actively search for and select the accessory device.

An application can be running on, for example, the mobile device. The application can be an application for controlling accessory devices in a house, such as a home application. The application can be installed on the mobile device. Although a house is discussed in the examples, some of the embodiments can be practiced in different locations, such as an apartment building or an office. These are merely examples and the example embodiments can apply to any location having accessory devices that can be controlled by an application.

A. Method Overview

FIG. 1 is an overview of a method for determining a location of a mobile device and identifying a corresponding accessory device suggest to a user, in accordance with some embodiments. The method 100, as shown in FIG. 1, can be performed by a controlling device, such as mobile device including a mobile phone, smart phone, laptop, tablet, and a wearable device (e.g., smart watch). The controlling device can also be a smart television or a desktop computer. The controlling device can be used to control accessory devices, such as a lamp, thermometer, window shades, garage door, etc.

At block 110, one or more cluster locations are determined. Initial sensor values are measured in order to determine cluster locations. The mobile device can detect a triggering event and then measure signals emitted from one or more signal sources existing at that point in space in response to the triggering event. For instance, the mobile device may detect a button press, which causes the mobile device to measure signals emitted from any electronic devices, e.g., a wireless router and a Bluetooth device. Additional trigger events can include invocation of an intelligent assistant on the mobile device (e.g., Siri), first-wake-of-day, battery charger connect, and/or interaction with an accessory device. The detected signals may be used to generate a multi-dimensional data point, where each dimension corresponds to a property of a signal emitted from a signal source. The multi-dimensional data point may represent the sensor position of the mobile device at the point in space. The sensor positions may be analyzed to form clusters of sensor positions. Although a multi-dimensional data point is described, a data point can also be a single scalar data point.

At block 120, devices that are associated with the cluster locations are determined. The mobile device may track which accessory devices are accessed or operated by the user at each sensor position. After collecting sensor positions and corresponding accessory device information, the mobile device may associate one or more accessory devices that are likely to be accessed by the user with the clusters of sensor positions.

At block 130, after accessory devices have been associated with cluster locations, a subsequent sensor value is measured. A cluster associated with the subsequent sensor value and an associated accessory device is identified. Accordingly, when a subsequent triggering event is detected, the mobile device may generate a subsequent sensor position and compare the subsequent sensor position to the clusters of sensor positions determined at step 110.

At block 140, an accessory device associated with a cluster of the subsequent sensor position is identified and suggested to a user. Specifically, if the new sensor position is determined to be within a threshold distance to one of the clusters of sensor positions, one or more accessory devices associated with that cluster of sensor positions may be identified and provided to the user as a suggested accessory device. In the event received signal strength indication (RSSI) is used, a threshold distance can be in dB. When time-of-flight is used, the threshold distance can be in meters. In the event the threshold value includes a mix of meters and dBs, a normalized combination of the measurements can be used. That is, there can be a mixture or a normalized threshold distance when a feature vectors contains a mixed set of values. For example, if the feature vector contains RSSI measurements in dB and range measurements in meters, the threshold distance can be a value that is a function of both meters and dBs. In addition, the unique ids (e.g., MAC addresses) can be used as part of the feature vector and the distance function can also be normalized by the relative number of unique ids.

The method described with respect to FIG. 1 is merely an example and the steps and order of the steps can be changed. For example, clustering of locations can be performed either before or after accessory devices have been associated with the sensor values. Further, the steps described in FIG. 1 are described in more detail below with respect to the other figures.

II. Identify Cluster Locations

Groups of sensor positions having similar parameters may form a cluster, which can be used to define a discrete location. One or more clusters may be used to identify an accessory device to suggest to a user in, for example, a message (e.g., display on a screen or an audio message).

Accessory devices can be associated with the one or more clusters. Specifically, accessory devices can be associated with a particular location of the mobile device. The location of the accessary device may be the same location or a different from the location of the mobile device. A location can also be called a microlocation. A location can be called a microlocation because the location refers to a specific area in, for example, the user's home. In addition, a location or microlocation can also be referred to as a cluster of locations. The terms location, microlocation and cluster of locations may refer to a same area or region.

A home may have three or four locations. A location can correspond to a room in a house or other areas in a house. For example, a location can be a backyard area, a front door area or a hallway area. Although a house is used as an example, any area or room in which accessory devices are located can be used in determining a cluster of locations.

A. Method of Identifying a Cluster of Locations

Figure 2:
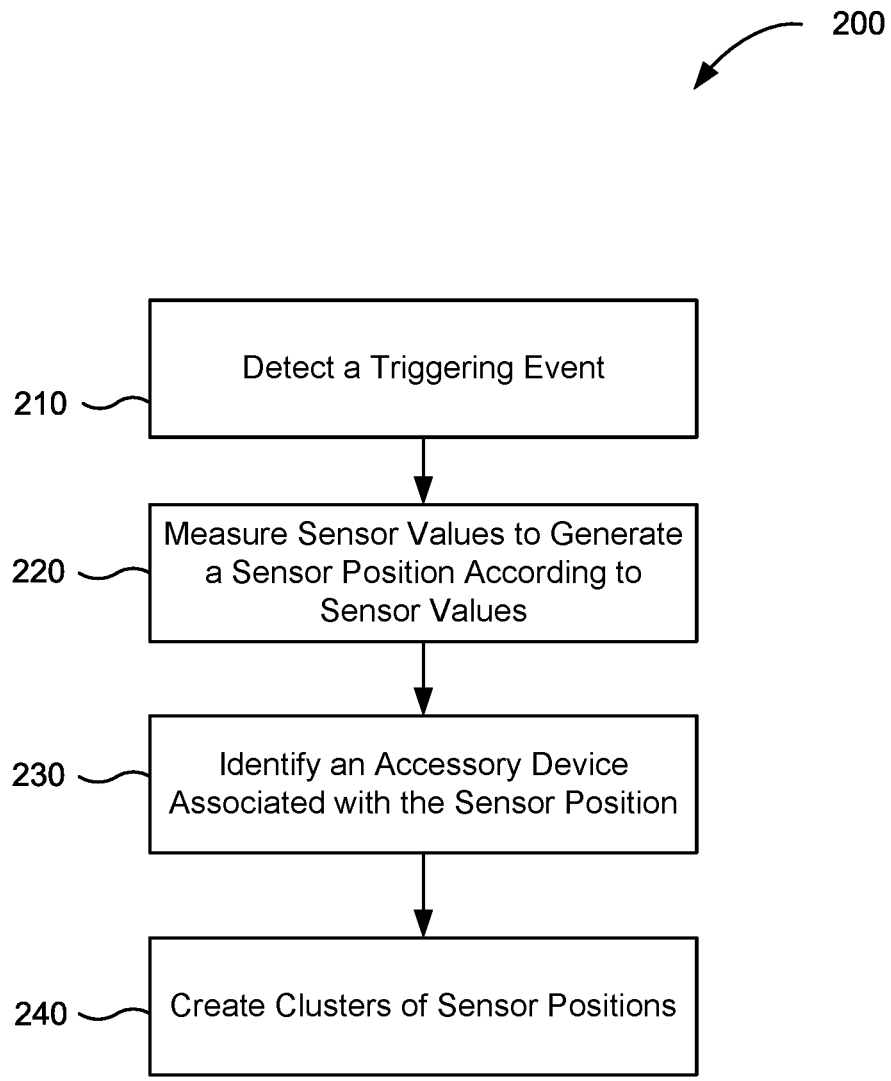
FIG. 2 illustrates a flowchart of a method for determining a cluster of locations, in accordance with some embodiments.
Figure 3A:
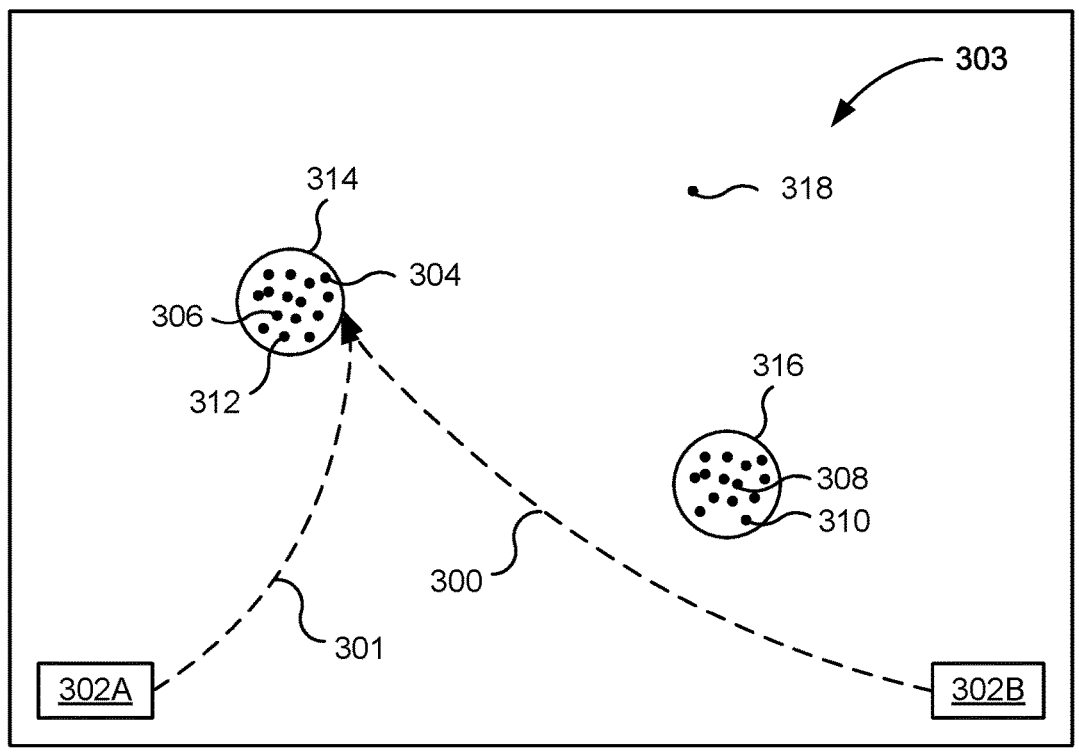
FIG. 3A is a simplified diagram illustrating clusters of physical positions in physical space, in accordance with some embodiments.
Figure 3B:
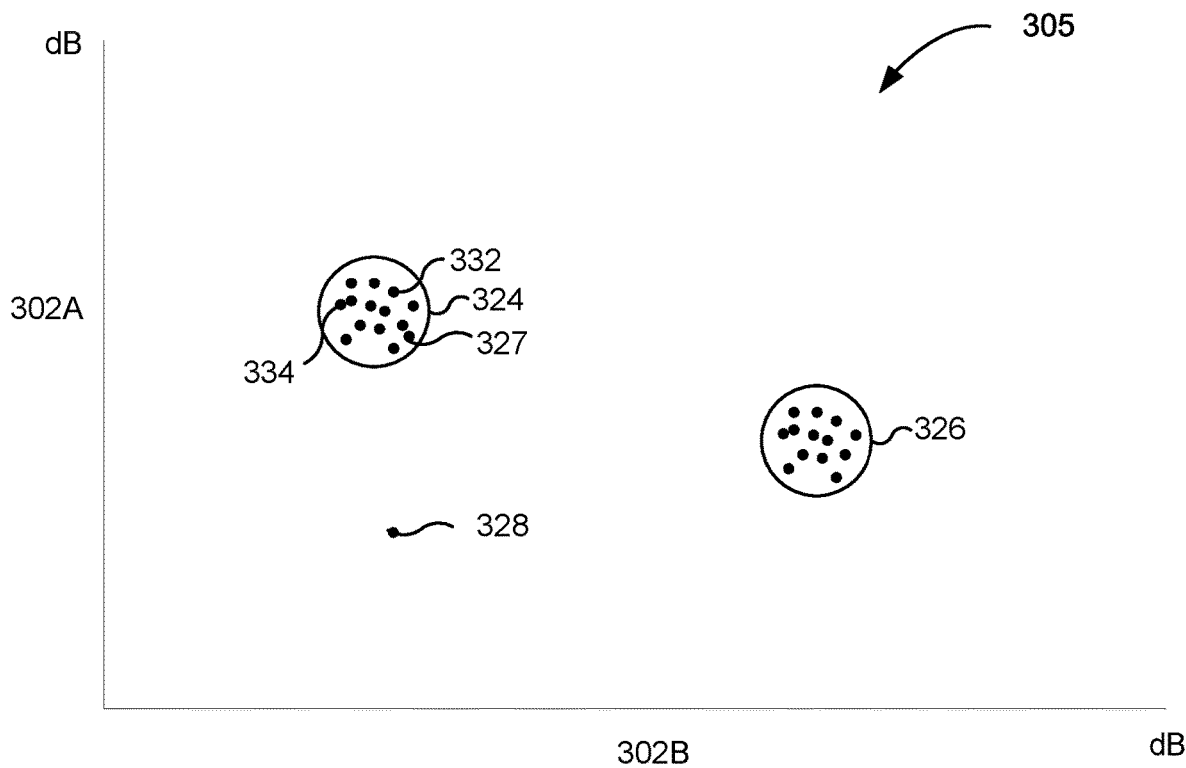
FIG. 3B is a simplified diagram illustrating clusters of sensor positions in sensor space corresponding to the physical positions in physical space of FIG. 3A, in accordance with some embodiments.

FIG. 2 illustrates a flow chart of a method 200 for determining a cluster of locations, in accordance with some embodiments. Method 200 can be performed by a controlling device such as a mobile device (e.g., a phone, tablet, and the like). FIG. 3A is a simplified diagram illustrating clusters of physical positions in physical space, in accordance with some embodiments. FIG. 3B is a simplified diagram illustrating clusters of sensor positions in sensor space corresponding to the physical positions in physical space of FIG. 3A, in accordance with some embodiments.

At block 210, a triggering event is detected. A triggering event can be identified as sufficiently likely to correlate to a unique operation of the mobile device with respect to an accessory device.

There may be different types of triggering events such as learning triggering events and prediction triggering events. A triggering event can be identified as an event sufficiently likely to correlate to an operation of the mobile device. A triggering event can be caused by a user and/or an external device. For instance, the triggering event can be a specific interaction of the user with the mobile device. The specific interaction can be used to learn what the user does at a particular position, and thus can be considered a learning triggering event.

These learning triggering events may include, but are not limited to, actions related to launching applications, activity within an application, invoking a voice-controlled service or intelligent assistant (e.g., Apple Siri™), first-wake-of-the-day (e.g., interacting with the phone after an elongated period of time has elapsed), establishing Bluetooth or connections, or any other related triggering event, such as interacting with a specialized accessory connected with the mobile device (e.g., Apple HomeKit™) or swiping actions on a user interface of the mobile device. In addition, time can also be a learning triggering event. For example, if a particular time is determined, the time can be used to determine whether an activity associated with an accessory device is to be performed. An additional learning triggering event can include entry into a predetermined location or microlocation.

As other examples, a learning triggering event can be when an accessory device is connected to the mobile device, e.g., inserting headphones into a headphone jack, making a Bluetooth connection, and the like. A list of events that are triggering events can be stored on the mobile device. Such events can be a default list and be maintained as part of an operating system, and may or may not be configurable by a user.

In some embodiments, the new triggering event is a prediction triggering event, which is used to detect when to make a prediction of action that might be taken with an application on the mobile device, as opposed to just an event to learn what the user does. As an example, the user can press a button or touch a touch-sensitive display screen to cause a backlight of the mobile device to turn on, such as pushing a home button, thereby indicating that the user intends to interact with the mobile device. Other examples of triggering events include the user moving around substantially while on lock screen or home screen. Some prediction triggering events can also be learning triggering events.

Prediction triggering events may be triggering events that indicate that the user intends to perform an action that has a dependence on the location of the device in a finer spatial resolution. One example of a predetermined event is turning on the backlight of a device. Turning on the backlight of a device is a triggering event that often occurs when the user would like to access a particular accessory device while located within the user's home. For instance, when a user is at home, the user typically turns on the backlight of the mobile device to access an accessory device to control lighting. Such accessory devices may correspond to specific locations within the home, and may thus require the mobile device to be able to determine the mobile device's location at a finer resolution (e.g., determining that the mobile device is in the kitchen of a home). Other prediction triggering events include button presses that open the home screen and substantial movement, e.g., the device has moved a certain distance.

A list of events that are triggering events can be stored on the mobile device and can be predetermined or configured by a user or a manufacturer. Such events can be a default list and be maintained as part of an operating system.

At block 220, one or more sensor values are measured by the mobile device to generate a sensor position in the form of a data points, including multi-dimensional data points. A sensor position can correspond to, for example, sensor position 332 of FIG. 3B. The sensor position may be a measurement of the one or more sensor values at a point in space. The sensor values may correspond to one or more signal properties of a signal (e.g., signals 300 and 301 in FIG. 3A) emitted from one or more signal sources (e.g., signal sources 302A and 302B in FIG. 3A). A signal source may be any suitable device configured to emit wireless signals. For example, a signal source may be an access point such as a wireless router, a Bluetooth device, or any other networking device suitable to transmit and/or receive signals. Different devices can be identified based on an identifier in the signal. Each measurement from a different device can correspond to a different sensor value.

FIG. 3A is a simplified diagram illustrating clusters of physical positions in physical space 303, in accordance with some embodiments. As examples, physical space 303 can be the interior of a home, an office, a store, or other building. Physical space 303 may include a plurality of signal sources, such as signal sources 302A and 302B. Each signal source can emit wireless communication signals, as are emitted from a wireless router or a Bluetooth device. A signal source can be considered a stationary device, as their position does not typically change.

A mobile device may be located within physical space 303 such that one or more signals emitted from signal sources 302A and 302B are detected. For example, the mobile device may be located at physical position 304 in FIG. 3A, where signals 301 and 300 are detected from signal sources 302A and 302B, respectively. It is to be appreciated that the mobile device may only measure one of signals 301 and 300 at some positions, e.g., due to signal degradation at certain positions. Furthermore, the mobile device can be at a physical position where signals from other signal sources (not shown) that are outside of physical space 303 can be detected, and that embodiments herein are not limited to physical positions where the mobile device can only detect signals 301 and 300.

Typical human behavior results in the mobile device being used in some physical locations more often than other physical locations. For example, a user may use a mobile device more often when the user is on a couch or in a bed. These physical locations may be represented by clusters of physical positions, such as clusters 314 and 316 of physical positions. Each cluster may have a group of physical positions that are located close together. As an example, cluster 314 may include physical positions 304, 306, and 312. As shown, cluster 316 includes physical positions 308 and 310. According to embodiments, the mobile device may be configured to determine when the mobile device is in one of these clusters based on the detected signals (e.g., signals 300 and 301) and identify an application that is associated with the cluster.

As part of detecting signals at any of the physical positions using sensor(s) of the mobile device, the mobile device may measure one or more sensor values from signals emitted from signal sources 302A and 302B. For instance, if the mobile device is at physical position 304, the mobile device may measure sensor values from signal 301 emitted from signal source 302A and signal 300 from signal source 302B. The measured sensor values may be signal properties of signal 301 and signal 300. The measured sensor values may be used to form a sensor position in sensor space, as shown in FIG. 3B.

FIG. 3B is a simplified diagram illustrating clusters of sensor positions in sensor space corresponding to the physical positions in physical space 303, in accordance with some embodiments. Sensor space 305 is depicted as a plot of measured sensor positions in signal strength. The X axis may represent measured values of signals from signal source 302B in dB increasing to the right, and the Y axis may represent measured values of signals from signal source 302A in dB increasing upwards.

The sensor positions in sensor space correspond to respective physical positions in physical space 303. For example, measured sensor values at physical position 304 in FIG. 3A corresponds to a sensor position 332 in sensor space shown in FIG. 3B. Sensor position 332 is represented as a two-dimensional data point where one dimension corresponds to a sensor value from signal source 302A and the other dimension corresponds to a sensor value from signal source 302B. Sensor space 305 may include clusters of sensor positions, e.g., cluster 324 of sensor positions and cluster 326 of sensor positions. Clusters 324 and 326 of sensor positions correspond with cluster 314 and 316 of physical positions in FIG. 3A, respectively.

Clusters 324 and 326 may be unlabeled locations, meaning the mobile device does not know the actual physical coordinates corresponding to clusters 324 and 326. The device may only know that there exists a cluster of sensor positions that have similar sensor values and that the cluster represents a discrete location in physical space. However, the mobile device may perform functions based on sensor positions in sensor space such that use of the mobile device in physical space is benefitted. For instance, the mobile device may determine a sensor position of the mobile device and suggest an application to the user based on whether the sensor position is within a cluster in which pattern of application usage is known. The method of forming clusters and suggesting an application according to a sensor position are further discussed below.

Accordingly, a sensor position can correspond to a set of one or more sensor values measured by sensor(s) of a mobile device at a physical position in physical space from one or more wireless signals emitted by one or more signal sources (e.g., external devices such as networking devices). A sensor value can be a measure of a signal property, e.g., signal strength, time-of-flight, or data conveyed in a wireless signal including the device's unique id, as may occur if a signal source measures a signal property from the mobile device and sends that value back to the mobile device. Each sensor value of a set can correspond to a different dimension in sensor space, where the set of one or more sensor values forms a data point (e.g., a multi-dimensional data point, also called a feature vector) in the sensor space.

In the embodiment shown in FIG. 3A, sensor values for sensor positions in cluster 314 may be higher for signal source 302A (which is in the vertical axis in FIG. 1B) than the sensor values for sensor positions in cluster 316, e.g., when the sensor value is signal strength. This may be due to the fact that physical positions in cluster 314 are closer to signal source 302A than physical positions in cluster 316 are to signal source 302A. When the sensor value is a signal property of time-of-flight, the values for cluster 314 would be smaller than for cluster 316.

A given measurement of the one or more wireless signals obtained at a physical position may be made one or more times over a time interval to obtain a set of sensor value(s). Two measurements at two different times can correspond to a same sensor position, e.g., when the two measurements are made at a same physical position at the two different times. A sensor position can have a value of zero for a given dimension, e.g., sensor position if a particular wireless signal is not measured.

The signal values measured by the mobile device may be properties of signals emitted from the signal sources. In some embodiments, the signal values may be values corresponding to signal strengths of measured signals, such as received signal strength indication (RSSI) values or any other suitable signal property whose value changes with respect to a distance of separation from a signal's point of origin. In other embodiments, the signal values may include signal properties indicative of a distance between the mobile device and the signal's point of origin, such as a time-of-flight including a round trip time (RTT) measurement value.

At block 230, the mobile device can identify an accessory device operated by the user at each of the corresponding data points. In some embodiments, a correlation between a sensor position and an accessory device may be determined when the accessory device is used or accessed multiple times at the sensor position or nearby sensor positions (e.g., as part of a same cluster). This correlation may be useful in predicting which accessory device the user will likely run when a sensor position is measured. This correlation can also be useful in predicting a scene and accessory devices associated with the scene that a user will likely operate.

At block 240, the recordings of various sensor positions may be analyzed to form clusters of sensor positions. For instance, as shown in FIG. 3B, sensor positions 334 and 332 may be analyzed and grouped into cluster 324.

The steps of method 200 can be repeated in order to gather data regarding locations and accessory devices used in the locations. In addition, the steps of method 200 can be performed for each user in a home.

B. Dual Level Resolution for Determining Location

According to some embodiments, predicting an application based on a sensor position may be a dual level procedure. The first level may be performed to determine a general location of the mobile device, and the second level may be performed to determine a more finite location within the general location of the mobile device. Determining a general location of the mobile device can be performed using GPS information. Specifically, GPS data may be received to determine a general location of the mobile device. GPS data may include latitude and longitudinal coordinates that represent a specific geographical location. Determining a more finite location within the general location of the mobile device may be performing using a sensor position. The mobile device may initiate a determination of a sensor position of the mobile device. The sensor position may correspond to a location within the general location at a finer resolution than what can be achieved by using GPS data. In addition to GPS data, GLONASS data, Galileo data, BeiDou data and WiFi location data or combinations thereof can be used. The finer resolution location can be called a cluster or a microlocation.

The dual level procedure may be performed upon detection of a predetermined triggering event that is indicative of the need for determining higher spatial resolution. The dual level resolution performed by embodiments discussed herein is to ensure that the mobile device performance costs associated with determining a sensor position are not wasted on locations that do not need a finer resolution for determining location.

C. Sensor Positions and Sensor Clusters

According to some embodiments, a mobile device may determine a sensor position within a general location. The sensor position may be a position in space represented by sensor values measured from wireless signals emitted from signal sources. When several sensor positions are recorded, the mobile device may recognize a distribution of sensor positions and form clusters of sensor positions represented by groups of sensor positions having similar sensor values. The clusters of sensor positions may be used to predict accessory devices and determine actions associated with those accessory devices to a user, as discussed herein.

Each signal source may be a device configured to emit wireless signals. For example, a signal source may be an access point (AP) such as a wireless router, a Bluetooth device, or any other communication device suitable to transmit and receive signals. The signal values measured by the mobile device may be properties of signals emitted from the signal sources. In some embodiments, the signal values may be values corresponding to signal strengths of measured signals, such as received signal strength indication (RSSI) values or any other suitable signal property that changes with respect to distance from a signal's point of origin. In other embodiments, the signal values may be a signal indicative of a distance between the mobile device and the signal's point of origin, such as a, time-of-flight which can include a round trip time (RTT) measurement value or any other suitable signal type.

In addition to the sensor values, the mobile device may also receive and record an identification (ID) of the signal source. The signal source ID may be any suitable form of identification for the signal source, such as a media access control (MAC) address, internet protocol (IP) address, Bluetooth device address, universally unique identifier (UUID), truncated UUID and the like. The identification of the signal source may be appended to a respective sensor value received by the signal source such that the mobile device may keep track of which signal source emitted the measured signal value. Other information may also be appended to the measured signal value. For example, information representing a time interval across which the signal value was measured may also be appended to the measured signal value, as will be discussed in more detail in section IV(B) herein. According to embodiments, the sensor values may be measured by sensors in the mobile device.

D. Accessory Devices

The accessory devices themselves can be used to determine, for example, the dimensions or location of a room and in order to obtain a spatial relationship of accessory devices in a room. RSSI measurements can be obtained from each of the accessory devices in a home, and these measurements can be used to define the boundaries or shape of a room. For example, if the accessory devices are kitchen related devices, the boundaries or shape of the kitchen can be determined. Such information can also assist in the automation of the home application in suggesting accessory devices to be controlled.

A location can be tied to a particular room or area based on, for example, a user regularly or repeatedly changing accessory devices of a particular room when in a particular location. The threshold value of regularity or frequency can be used to determine whether a location should be tied to one or more accessory devices.

Step counts and pedestrian dead reckoning (PDR) can be used to help determine the dimensions of a location. For example, the mobile device can include sensors to measure the distance that a user is walking or stepping as they turn on lights in, for example, a room or a house. Motion detectors and motion sensors in, for example, the accessory devices, can also be used to aggregate data regarding a user's movement in a room or area. The aggregated data can be used to determine the type of the room or area and the size and dimensions of the room or area. Further, the motion detectors in the accessory devices can be used to determine a location of one or more users. Specifically, the motion detectors in the accessory device can be used to determine the activity of a user in, for example, a room and a user's proximity to an accessory device.

In addition, a user can assign accessory devices to particular rooms and a database of accessory devices and their corresponding rooms can be maintained. A location of a user can later be identified according to accessory devices near by a user.

III. Suggest/Predict Accessory Device Based on Location

After clustering of locations has been performed, the clustered locations can be used to predict or suggest accessory devices to a user according to a current location of the mobile device of the user.

Figure 4:
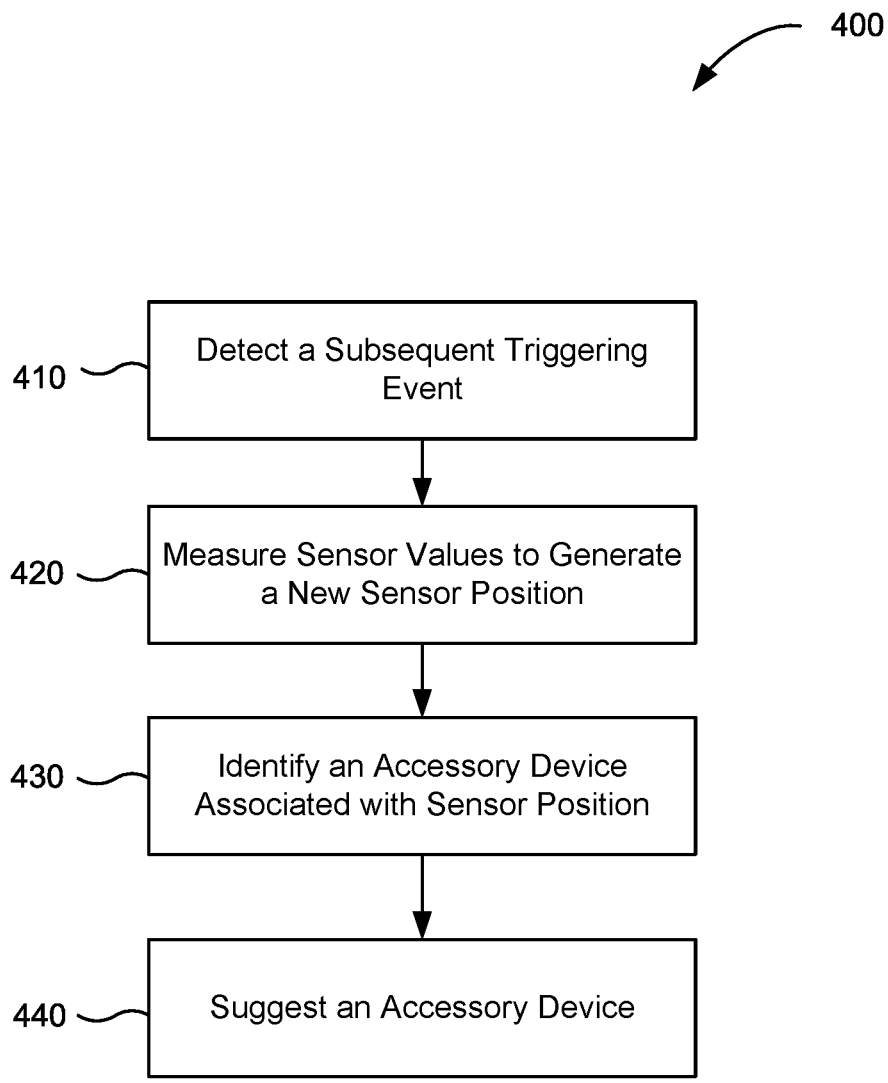
FIG. 4 illustrates a flowchart of a method for suggesting an accessory device, in accordance with some embodiments.

A. Method of Suggesting Accessory Device According to Identified Cluster of Locations FIG. 4 illustrates a flowchart of a method for suggesting an accessory device, in accordance with some embodiments. After cluster locations have been associated with accessory devices as described with respect to FIGS. 2, 3A and 3B, the determined cluster locations and associated accessory devices can be used to suggest accessory devices to a user when the user is at a same or similar location.

At block 410, a new triggering event may be detected. Detection of the new triggering event may be similar to the detection of the triggering event discussed with reference to block 210, but the new triggering event may occur at a later time and a different physical location.

Thereafter, at block 420, one or more sensor values are measured by the mobile device to generate a new sensor position. Generating the new sensor position may also be similar to generating the sensor position discussed with reference to block 220, but the new sensor position may be generated at a later time. The new sensor position can correspond to a previously determined sensor position.

At block 430, an accessory device is identified. In some embodiments, the accessory device may be identified by comparing the new sensor position with the generated clusters of sensor positions. If the new sensor position is positioned within a threshold distance to a known cluster of sensor positions, then the identified accessory device associated with the known cluster of sensor positions may be identified. As an example, referring back to FIG. 3B, new sensor position 327 may be positioned to be within a threshold distance to cluster 324. Accordingly, the accessory device associated with cluster 324 (e.g. garage door) may be identified for the new sensor position 327.

In some embodiments, the new sensor position may not be positioned within a threshold distance to a known cluster, as illustrated by new sensor position 328. In such embodiments, the mobile device may record new sensor position 328 and track the associated accessory device accessed by the user at new sensor position 328 for future reference. But, a specific action may accessory device may not be suggested, as a cluster has not yet been identified for that location.

As mentioned herein, the mobile device may not know that clusters 324 and 326 are associated with a physical location in a home, such as a kitchen or a bedroom. Rather, the mobile device may only know that the measured sensor positions form groups of sensor positions, as shown in FIG. 3B, and may associate each group of sensor positions with a discrete location.

At block 440, an action is performed in association with the accessory device. In some embodiments, the action may be providing a message including or using the identified application, such as a notification that an application has been identified. A message is described however other methods for notifying a user can be used. The mobile device may not require the user to input survey or floor plan information to determine the device's location.

In some embodiments, the action may be providing a user interface for a user to select to run the accessory device. The user interface may be provided in various ways, such as by displaying on a screen of the mobile device, projecting onto a surface, or providing an audio interface. A particular user interface provided to the user may depend on a degree of probability of being performed by the user. For instance, in some embodiments, the higher the probability of use, more aggressive action can be taken, such as automatically operating an accessory device, as opposed to merely providing an easier mechanism to access the accessory device via the home application.

Further, the example discussed above describes the suggesting of accessory devices. However, rooms and/or accessory devices associated with the rooms, and scenes and/or accessory devices associated with the scenes can also be suggested.

IV. System for Identifying and Suggesting an Accessory Device

Figure 5:
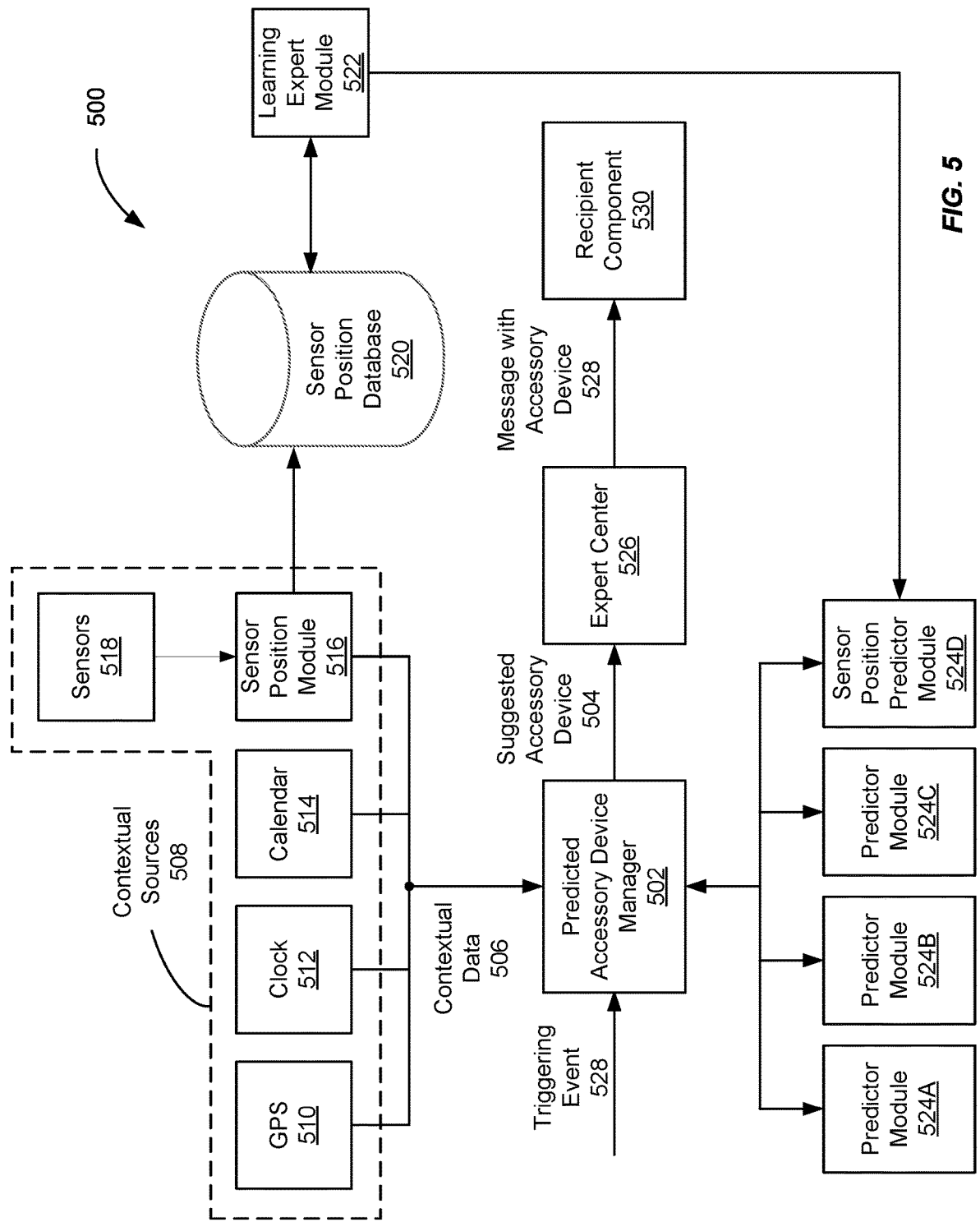
FIG. 5 illustrates a simplified block diagram of a prediction system for identifying a sensor position and a corresponding accessory device, in accordance with some embodiments.

The methods described in, for example, FIG. 1, FIG. 2, FIG. 4 and FIG. 6 (described below) can be performed by, for example, a prediction system in a controlling device, such as a mobile device. FIG. 5 illustrates a simplified block diagram of a prediction system 500 for identifying a sensor position and a corresponding accessory device, in accordance with some embodiments. Prediction system 500 resides within the mobile device that is configured to control an accessory device. Prediction system 500 may include hardware and software components.

The mobile device may perform unsupervised learning of a user's pattern of accessory device usage according to a location of the mobile device, and then use that learned pattern to predict accessory devices to suggest to a user at a later time, via, for example, prediction system 500.

Prediction system 500 includes a predicted accessory device manager 502 for identifying a suggested accessory device. Predicted accessory device manager 502 can receive a triggering event (e.g., triggering event 528). The predicted accessory device manager 502 may use information gathered from the triggering event 528 to identify a suggested accessory device 504. As shown, predicted accessory device manager 502 may receive contextual data 506 in addition to the triggering event 528.

Contextual information may be gathered from contextual data 506 and may be received at any time. For instance, contextual information may be received before and/or after the triggering event 528 is detected. Additionally, contextual information may be received during detection of the triggering event 528. Contextual information may specify one or more properties of the mobile device for a certain context. The context may be the surrounding environment (type of context) of the mobile device when the triggering event 528 is detected.

For instance, contextual information may be the time of day the triggering event 528 is detected. In another example, contextual information may be a certain location of the mobile device when the triggering event 528 is detected. In yet another example, contextual information may be a certain day of year at the time the triggering event 528 is detected. Additionally, contextual information may be data gathered from a calendar. For instance, the amount of time (e.g., days or hours) between the current time and an event time. Such contextual information may provide more meaningful information about the context of the mobile device such that the predicted accessory device manager 502 may accurately suggest an accessory device that is likely to be used by the user in that context. Further, contextual information can include attitude of the mobile device, orientation of the mobile device, position of the mobile device on a user's body, and/or whether or not the mobile device is positioned on a user's body. Accordingly, predicted accessory device manager 502 utilizing contextual information may more accurately suggest an accessory device to a user than if no contextual information were utilized.

Contextual data 506 may be generated by contextual sources 508. Contextual sources 508 may be components of a mobile device that provide data relating to the current situation of the mobile device. For instance, contextual sources 508 may be hardware devices and/or software code that operate as an internal digital clock 510, GPS device 512, calendar 514, and a sensor position module 516 for providing information related to time of day, location of the device, and day of year, and a sensor position of the device respectively. Other contextual sources may be used.

Sensor position module 516 may be software code configured to receive information from sensors 518 and write data to a cluster database 520. In embodiments, sensor position module 516 may receive measurements of sensor values from sensors 518 and store the measured values as a sensor position in an entry in sensor position database 520. Sensors 518 may be a hardware component that is configured to detect transmission signals, such as WiFi signals, Bluetooth signals, radio frequency (RF) signals, cellular telephone signals and any other type of signal capable of transmitting information wirelessly. Sensor position module 516 may be coupled to a sensor position database 520 to store the detected sensor values for future reference by a learning expert 522, as will be discussed further herein. Sensor position module 516 may then use the measured sensor values to output a sensor position to predicted accessory device manager 502 as contextual data.

Predicted accessory device manager 502 may then use information gathered from both the triggering event 528 and contextual information 506 to identify a suggested accessory device 504. Predicted accessory device manager 502 may also determine an action to be performed.

In some embodiments, predicted accessory device manager 502 may be coupled to several predictor modules 524A-524D to identify the suggested accessory device 504. Each predictor module 524A-524D may be configured to receive information from predicted accessory device manager 502 and output a prediction back to predicted accessory device manager 502. The information sent to predictor modules 524A-524D may include triggering event 528 and any relevant contextual data 506, and the prediction outputted to predicted accessory device manager 502 may include one or more accessory devices and their corresponding confidence value representing how likely the user will run the accessory device based upon the received information.

Predictor modules 524A-524D may be configured for different purposes. For instance, predictor modules 524A-542D may be configured to predict an accessory device based on a triggering event, predict an action for controlling an accessory device of a home, predict an accessory device that is not currently installed on a device that a user may be interested in, and predict an accessory device based upon a sensor position (i.e., sensor position predictor module 524D). Depending on which types of triggering event is detected, predicted accessory device manager 502 may send the information to only those predictor modules. Thus, predicted accessory device manager 502 may send information to one predictor module, a subset of predictor modules 524A-524D, or all predictor modules 524A-524D.

According to some embodiments, each predictor module may have a set of evaluation rules for determining a prediction to send to predicted accessory device manager 502. The set of evaluation rules may be a list of predicted accessory devices and their respective confidence values. The set of evaluation rules may also include a set of one or more criteria associated with each predicted accessory device.

Once predicted accessory device manager 502 receives the predicted accessory device from predictor modules 524, the predicted accessory device manager 502 may send the suggested accessory device 504 to an expert center module 526. In some embodiments, the expert center module 526 may be a section of code that manages what is displayed on a device, e.g., on a lock screen, when a search screen is opened, or other screens. For instance, the expert center module 526 may coordinate which information is displayed to a user, e.g., a suggested accessory device, suggested contact, and/or other information. Expert center module 526 can also determine how to provide such information to a user. As aforementioned herein, a particular user interface provided to the user may depend on a degree of probability of being performed by the user. The higher the probability of use, more aggressive action can be taken, such as automatically opening an accessory device with a corresponding user interface (e.g., visual or voice command), as opposed to just providing an easier mechanism to open the application.

If the expert center module 526 determines that it is an opportune time for the suggested accessory device (or a message associated with the suggested accessory device) to be output to the user, the expert center module 526 may output a message 528 with a suggested accessory device 504 to a recipient component 530. Recipient component 530 may be a user interface of the mobile device itself, or a user interface of another device, such as a tablet, laptop, smart watch, smartphone, or other mobile device. In some embodiments where suggested accessory device 504 is included in message 528, recipient component 530 (e.g., a user interface) may communicate the suggested accessory device 504 to the user and solicit a response from the user regarding the suggested accessory device 504.

Recipient component 530 may require different levels of interaction in order for a user to run the suggested accessory device. The various levels may correspond to a degree of probability that the user will operate suggested accessory device 504. For instance, if the predicted accessory device manager 502 determines that suggested accessory device 504 has a probability of being run by the user that is greater than a threshold probability, recipient component 530 may output a prompt that allows the user to more quickly run the accessory device by skipping intermediate steps.

Alternatively, if predicted accessory device manager 502 determines that the probability of the user operating the identified accessory device is less than the high threshold probability but still higher than a lower threshold probability, the identified accessory device may be displayed as an icon. The lower threshold probability may be higher than a baseline threshold probability. The baseline threshold probability may establish the minimum probability at which a corresponding accessory device will be suggested. The user may thus have to perform an extra step of clicking on the icon to run the identified accessory device. However, the number of clicks may still be less than the number of clicks required when no accessory device is suggested to the user. In some embodiments, the threshold probability may vary according to accessory device type. In various embodiments, the high threshold probability may range between 75% to 100%, the lower threshold probability may range between 50% to 75%, and the baseline threshold may range between 25% to 50%. In a particular embodiment, the high threshold probability is 75%, the lower threshold probability is 50%, and the baseline probability is 25%.

In some embodiments, higher probabilities may result in more aggressive accessory device suggestions. For instance, if an accessory device has a high probability of around 90%, predicted accessory device manager 502 may provide an icon on a lock screen of the mobile device to allow the user to access the accessory device with one click of the icon. If an accessory device has an even higher probability of around 95%, predicted accessory device manager 502 may even automatically run the suggested accessory device for the user without having the user click anything. In such instances, predicted accessory device manager 502 may not only output the suggested accessory device, but also output a command specific to that accessory device.

According to some embodiments, predicted accessory device manager 502 may determine what level of interaction is required, and then output that information to expert center 526. Expert center 526 may then send this information to recipient component 530 to output to the user.

In some embodiments, recipient component 530 may display a notice to the user on a display screen. The notice may be sent by a push notification, for instance. The notice may be a visual notice that includes pictures and/or text notifying the user of the suggested accessory device. The notice may suggest an accessory device to the user for the user to select and run at his or her leisure. When selected, the accessory device may run. In some embodiments, for more aggressive predictions, the notification may also include a suggested action within the suggested accessory device. That is, a notification may inform the user of the suggested accessory device as well as a suggested action within the suggested accessory device. The user may thus be given the option to run the suggested accessory device or perform the suggested action within the suggested accessory device.

In some embodiments, the mobile device may track what accessory device is run at a sensor position, and then draw an association between the sensor position and the accessory device. The accessory device may be stored in sensor position database 520 along with the corresponding sensor position. In some embodiments, sensor position database 520 may store sensor position data during a certain period of time. As an example, sensor position database 520 may store sensor position data measured during the last seven weeks. Therefore, sensor position database 520 can be used to store aggregated data regarding sensor positions, accessory devices associated with the sensor positions, and actions associated with the accessory devices associated with the sensor positions. Keeping track of which accessory device is run at the sensor position helps evaluate the user's mobile device usage habits to update the evaluation rules stored in sensor position predictor module 524D for use in predicting accessory devices in line with the user's mobile device usage habits. In some embodiments, an expert module can routinely update predictor modules 524A-524D.

V. Method of Predicting an Accessory Device According to Location

Figure 6:
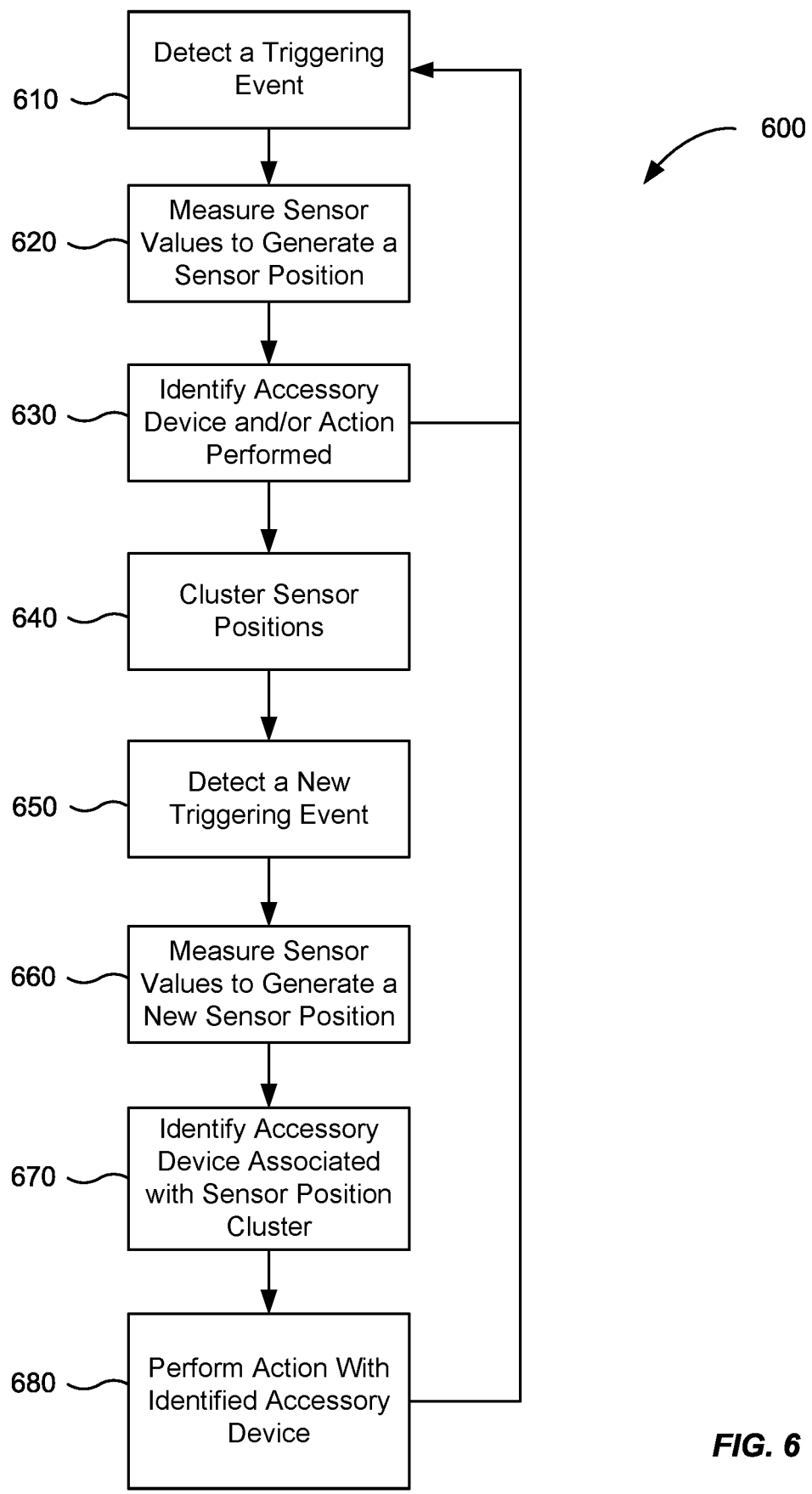
FIG. 6 illustrates a more detailed flowchart of a method for identifying and predicting an accessory device, in accordance with some embodiments.

FIG. 6 illustrates a flowchart of a method 600 for identifying and suggesting an accessory device, in accordance with some embodiments. The method 600 can include, for example, the steps described in FIGS. 1, 2 and 4. Therefore, similar descriptions will be omitted for brevity.

At block 610, a triggering event is detected. A triggering event can be identified as sufficiently likely to correlate to a unique operation of the device. A list of events that are triggering events can be stored on the device. Such events can be a default list and be maintained as part of an operating system, and may or may not be configurable by a user.

At block 620, one or more sensor values are measured by the device to generate one or more sensor positions.

At block 630, the device may identify an accessory device operated by the user for each of the sensor positions. In addition, the action or operation performed by the user in association with the accessory device can be identified. This step can be repeated for each sensor position.

At block 640, the measured sensor positions may be analyzed to form clusters of sensor positions (i.e., data points, such as multi-dimensional data points), as shown in, for example, FIG. 2A and FIG. 2B. Because the device has tracked the accessory device operated by the mobile device at the various sensor positions, one or more accessory devices may be associated with each cluster of sensor positions. In the example described in FIG. 6, accessory devices associated with the sensor positions are identified before the sensor positions are clustered. Alternatively, the sensor positions can be clustered and then the accessory devices associated with the clusters can be identified. For example, an accessory device used in a majority of the sensor positions in a cluster can be identified as a suggested accessory device for a particular cluster. Further, accessory devices can be ranked according to their frequency in a cluster, and the ranked accessory devices can be suggested to a user. For example, accessory devices having a higher rank can be suggested before accessory devices having a lower rank.

At block 650, a new triggering event may be detected. Detection of the new triggering event may be similar to the detection of the triggering event discussed with reference to block 610, but the new triggering event may occur at a later time and a different physical location. For example, it can be determined that the user is at a particular cluster.

Thereafter, at block 660, one or more sensor values are measured by the mobile device to generate a new sensor position. Generating the new sensor position may also be similar to generating the sensor position discussed with reference to block 620, but the new sensor position may be generated at a later time.

At block 670, an accessory device associated with the sensor positions is identified. In some embodiments, the accessory device may be identified by comparing the new sensor position with the generated clusters of sensor positions. If the new sensor position is positioned within a threshold distance to a known cluster of sensor positions, then the identified accessory device associated with the known cluster of sensor positions may be identified.

At block 680, an action is performed in association with the application. In some embodiments, the action may be the providing of a message including or using the identified application, such as a notification that an application has been identified. In some embodiments, the action may be the providing of a user interface for a user to select to run the application. The user interface may be provided in various ways, such as by displaying on a screen of the device, projecting onto a surface, or providing an audio interface. Alternatively, in some embodiments, an action associated with the predicted accessory device can be automatically performed.

Therefore, the home application can automatically suggest one or more accessory devices for the user to control according to a current location of the user sensed by the mobile device. Machine learning can be used to determine what accessory devices a user interact with while at a particular cluster in order to suggest possible accessory devices in the future based on a user's location.

The data aggregation can be performed based on the user's behavior and their controlling device. In addition, the data aggregation can be performed based on the home behavior for all of the users in the home. For example, if a particular mobile device is used by all of the user's in the home (e.g., a shared device), a home model or shared device model can be used for that particular device instead of a model corresponding to a particular user.

VI. Proactive/Automated Suggestion

As discussed above, instead of suggesting or predicting an accessory device, the predicted accessory device can be automatically operated. That is, after an accessory device is predicted, the associated accessory device can be automatically operated to perform a particular operation. The accessory device can be automatically operated based on information in, for example, a user profile, authorizing automatic operation of a predicted accessory device. Further, a scene with one or more accessory devices, a group of heterogenous or homogenous accessory devices, and a group of accessory devices for a room (e.g., living room) can also be predicted and suggested.

Additional information can be used to determine whether an accessory device should be suggested to a user. For example, current outdoor lighting conditions, weather, and temperature information can be used to suggest accessory devices to a user. Upon determining the current outdoor lighting conditions, weather, and temperature information, an accessory device can be automatically operated. Therefore, the operation of the accessory devices can be based on external conditions in addition to the machine learned interactions of the users and accessory devices.

For example, an outdoor temperature can be obtained and if the temperature has increased, then the home application, via one or more controlling devices, can determine that the temperature inside the home should be decreased (e.g., the inside of the house should be made cooler). Therefore, an accessory device, such as a thermometer, can be adjusted according to detected external or internal temperatures.

As another example, if a room is located on, for example, an east side of the house where the sun is rising, the temperature in the room on the east side of the house may be warmer than a temperature on the west side of the house while the sun is rising. Therefore, an accessory device, such as a thermometer for the corresponding room, can be adjusted according to the change in temperature. Although temperature is described as an example, other environmental conditions can be determined, such as humidity, weather, air movement, lighting levels, etc.

Based on, for example, the determined temperature, accessory devices within the home can be automatically adjusted. In addition, accessory devices can be automatically adjusted for a particular room which may be warmer or cooler depending on the particular time of the day or season.

The determined environmental conditions can be used in conjunction with, for example, the cluster locations, time information etc., in order predict an accessory device to suggest to a user.

VII. System of Controlling Devices and Accessory Devices

In the examples described above, a single mobile device operating in a home environment has been described. However, a user can operate multiple devices (e.g., smart watch, smart TV, tablet, etc.), and there can be one or more additional users each having one or more mobile devices for controlling accessory devices in the home. Each of the devices in a home can act as a controller for controlling the accessory devices.

Figure 7:
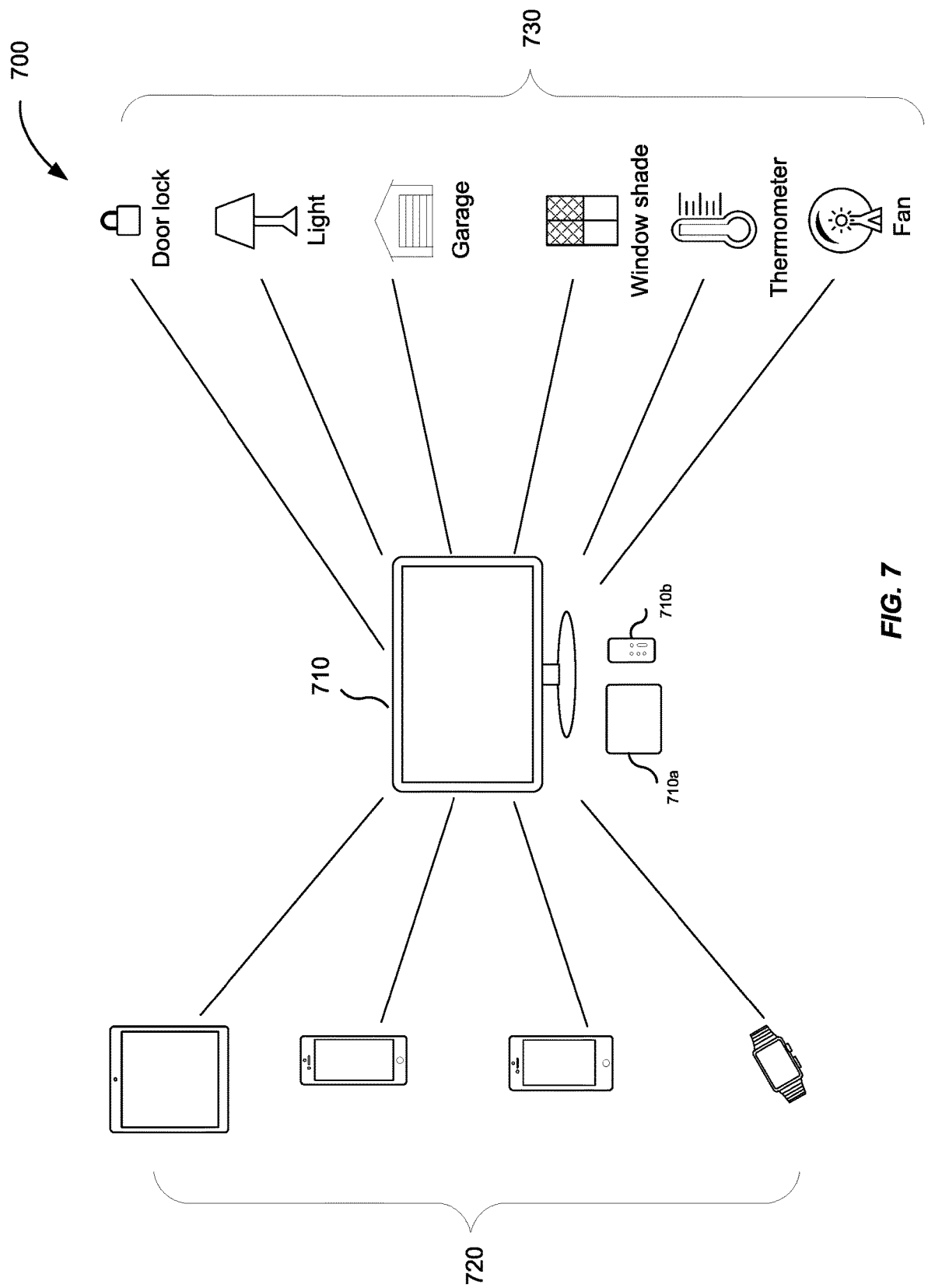
FIG. 7 illustrates an overview of a system including controlling devices and accessory devices, in accordance with some embodiments.

FIG. 7 illustrates an overview of a system 700 including controlling devices 720 and accessory devices 730, in accordance with some embodiments. As shown in FIG. 7, a smart TV 710 can act as a hub for all of the controlling device 720 (e.g., smart phone, tablet, smart watch, etc.). The smart TV 710 can also be a controlling device. The smart TV shown in FIG. 7 can include an Apple TV™ 710a and remote controller 710b. The controlling devices 720 can control and operate the accessory devices 730 (e.g, door lock, light, garage door, window shade, thermometer, fan, etc.). The smart TV 710 can be a central hub that gathers data for distribution between the controlling devices 720 and the accessory devices 730. Therefore, by having a central point maintaining and distributing information between controlling devices 720 and accessory devices 730, each of the controlling devices 720 do not need to keep track of all of the aggregated information regarding locations and corresponding accessory devices. Although the smart TV 710 is described as the hub, other controlling devices can be identified as a central hub.

The home application can be automatically configured for each controlling device 720 and/or for each user based on a history or previous activity with one or more accessory devices 730. The home application can aggregate information based on the accessory device usage of one or more users and across one or more accessory devices.

Each of the controlling devices or preconfigured controlling devices can be programmed to share information with each other or with particular devices. For example, a mobile device can share the aggregated data with a smart watch or tablet device of a user. A user can determine which devices can share information according to a user's preferences. Alternatively, all of the devices in a user's account (e.g., an account in a suite of cloud-based services) can share information with each other. Therefore, one or more devices can be used to aggregate data (e.g., user activity with an accessory device at a location) and the data can be shared between the user's devices.

Since the controlling devices can share information, different controlling devices can be used to control accessory devices. For example, if the user usually uses their mobile phone to check the status of the back door lock while on the front door area, but the user's mobile phone is not readily available (e.g, in bottom of their bag), the home application on the user's smart watch and any additional controlling devices may display suggested accessory device information.

In addition, the controlling devices of a first user can share information with controlling devices of other users. Therefore, if a first user does not have any device while at the front door area, a second user who has a controlling device can be used to check the status of the back door lock. In the event both users have their controlling devices, priority can be determined between devices. For example, one user can be identified as the "owner" of the home and therefore, the owner configuration should be given priority before other user configurations.

The model that is determined for the owner can be used for all users in the home. Alternatively, each user in the home can have their own model regarding the accessory devices that are suggested to the user based on the user's location. In addition, the models for each user can be customized according to preferences of each of the users.

The data model for each of the users and devices can be tested to determine its accuracy and can continue to be changed and perform machine learning according to inputs made by the user.

As described above, an aspect of the present technology is the gathering and use of data available from various sources to improve the delivery to users of invitational content or any other content that may be of interest to them. The present disclosure contemplates that in some instances, the gathered data may include personal information data that uniquely identifies or can be used to contact or locate a specific person. Such personal information data can include demographic data, location-based data, telephone numbers, email addresses, twitter ID's, home addresses, or any other identifying information.

The present disclosure recognizes that the use of such personal information data, in the present technology, can be used to the benefit of users. For example, the personal information data can be used to deliver targeted content that is of greater interest to the user. Accordingly, use of such personal information data enables calculated control of the delivered content. Further, other uses for personal information data that benefit the user are also contemplated by the present disclosure.

The present disclosure further contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services. In another example, users can select not to provide location information for targeted content delivery services. In yet another example, users can select to not provide precise location information, but permit the transfer of location zone information.

VIII. User Interface

Figure 8:
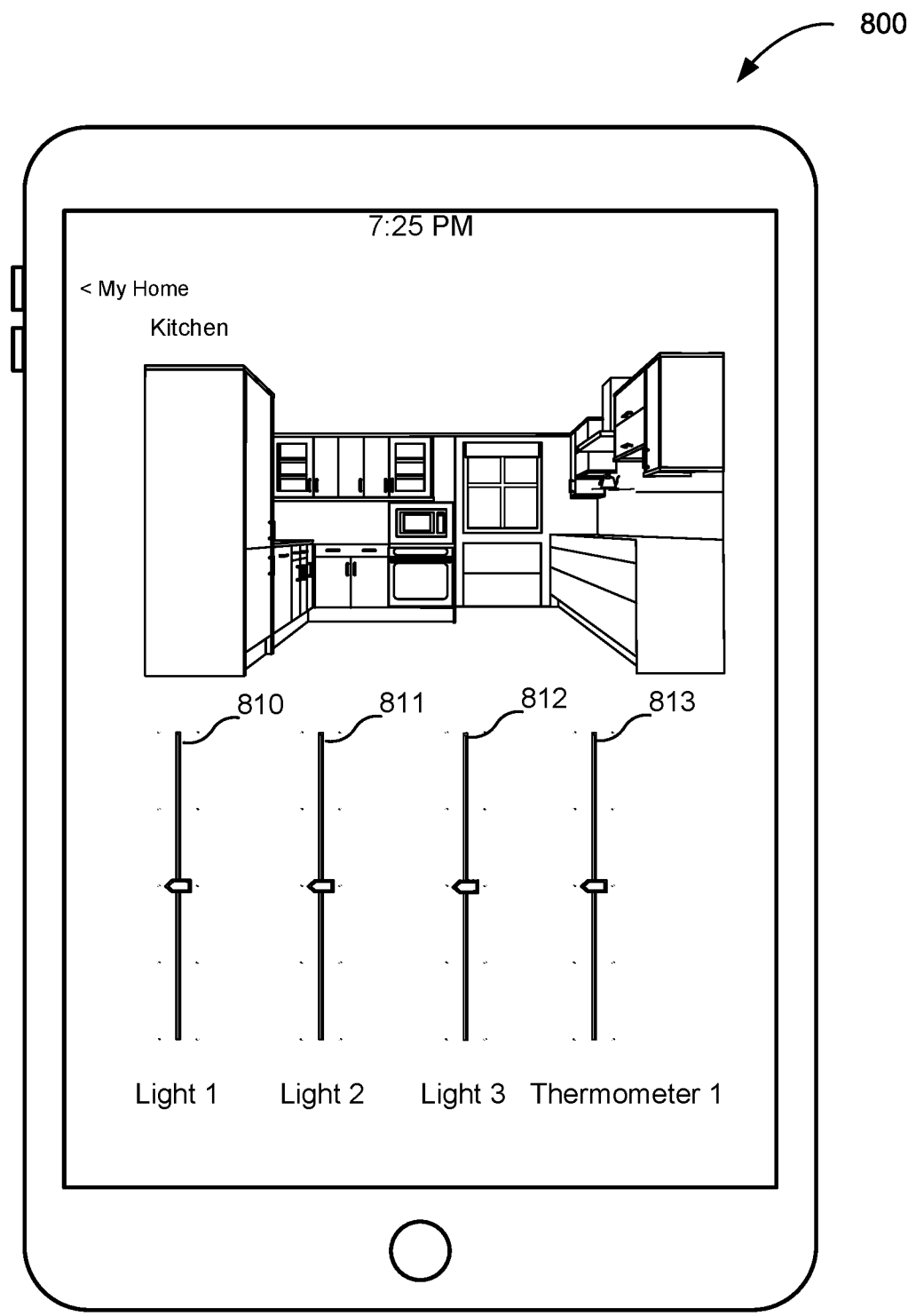
FIG. 8 illustrates a user interface of a home application for viewing and controlling accessory devices, in accordance with some embodiments.

FIG. 8 illustrates a user interface 800 of an application for viewing and controlling accessory devices, in accordance with some embodiments.

As shown in FIG. 8, the accessory devices (e.g., light 1, light 2, light 2, thermometer 1) displayed on the user interface can be displayed according to a location of a user. For example, when the user is currently located outside their front door, the user may routinely check whether the lights are off in the kitchen and that the thermostat is at a desired temperature. Therefore, as shown in FIG. 8, when the sensors of the mobile device determines that the user is outside of their front door, a user interface as shown in FIG. 8 can be displayed to the user. A user does not have to go to the home application to search for and identify a particular room and the particular accessory devices in the room to be controlled. Instead, the light information and temperature information of the lights and thermometer in the kitchen will automatically be provided to a user based on their location and based on learned information regarding the devices the user will operate while at the front door area. Therefore, user can quickly and easily determine the status of the lights and thermometer in the kitchen.

In the example described with respect to FIG. 8, the user of the mobile device is in a separate location from the accessory devices to be controlled, however, this is merely an example. The user of the mobile device may be in a same location as the accessory devices to be controlled.

Also, when the user is in a particular area (e.g., front door area), accessory devices from more than one location in, for example, from several rooms in the house, may be provided to the user. For example, all of the lights in the bedrooms of the house can be displayed to the user on the user interface, when the user is at the front door area. The accessory devices can also be identified according to the particular room or area in the home to which they belong.

In addition, the accessories that are displayed on the user interface can be customized according to user preferences. For example, particular accessory devices most often used by the user can be displayed and not every accessory device that the user accesses while at a particular location is displayed.

As shown in FIG. 8, a slider bar can be used to adjust the accessory devices. A slider bar is merely an example and other ways for controlling an accessory device can be used. For example, swiping functions (e.g., swipe right, swipe left, swipe up, swipe down, etc.) and tapping functions (e.g., single tap, double tap, etc.) can be used to control accessory devices.

Therefore, the user interface can display one or more suggested accessory devices, from one or more areas of a house, according to a user's current location.

Each user can create a profile or set of information including information that they would like displayed on the user interface regarding the accessory devices and the user can indicate, for example, accessory devices they would like suggested to them for future locations.

Although a separate slider 810, 811, 812 and 813 is shown for each of the accessory devices, one or more of the accessory device can be controlled by a single slider or control, in order to increase the ease of identifying and controlling accessory devices. For example, light 1, light 2, and light 3, as shown in FIG. 8, can be controlled by a single slider or control. Although light 1, light 2, and light 3, are controlled, one or more devices that are controlled by the user according to their location can be suggested to the user on the user interface. Therefore, when the user is at the front porch area, the user interface can display a single control that can use to turn off all of the lights in the kitchen or a single control to check that the status of lights (e.g., whether the lights are off or on) in the kitchen.

The displayed page can also be an aggregation of accessory devices that are often accessed at a particular location. Therefore, more than one accessory device may be displayed for a particular location. A customized page of accessory devices can be created for a particular location, such as for each room in a house.

In addition, the user interface can be used by the home application to suggest settings based on, for example, a user's history of use of accessory devices. For example, if a user has historically requested that lights be turned off when the user reaches the front door area, when a lamp is added, the application may suggest that the lamp be turned off similar to the other lighting devices, when the user reaches the front door area. In addition, the home application may be proactive and issue commands automatically based on a user's previous usage and perform control without user input.

FIG. 8 is merely an example of a user interface and user interface can vary. For example, the user interface can vary according to user or according to the type or amount of content displayed. Further, a user interface can display one or more accessory devices associated with a particular scene. User interfaces that can be used in accordance with the embodiments can include those disclosed in commonly-owned U.S. Provisional Application No. 62/349,043, directed to "Controlling Accessory Groups," filed Jun. 12, 2016, which is incorporated by reference in its entirety for all purposes.

Figure 10:
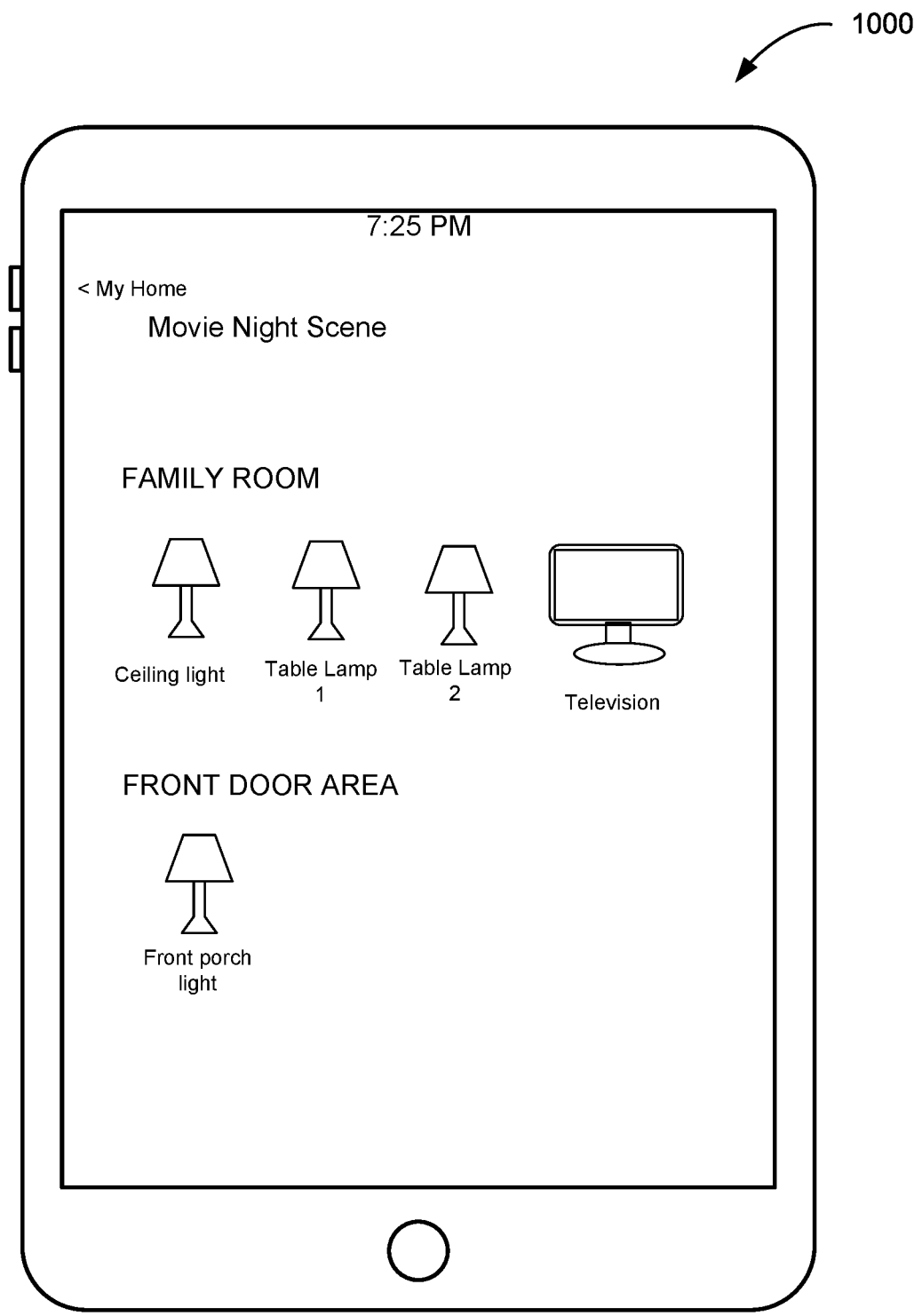
FIG. 10 illustrates a user interface of a home application for viewing and controlling a scene, in accordance with some embodiments.

Another example of a user interface is shown in FIG. 10. FIG. 10 illustrates a user interface 1000 of a home application for viewing and controlling a scene, in accordance with some embodiments. The scene shown in FIG. 10 is a "movie night" scene. The scene "movie night" can include adjusting (e.g, turn on, turn off, dim, etc.) the one or more lights in the family room, adjusting the lights on the front porch area, and controlling a television or display device in the family room.

IX. Example Device

Figure 9:
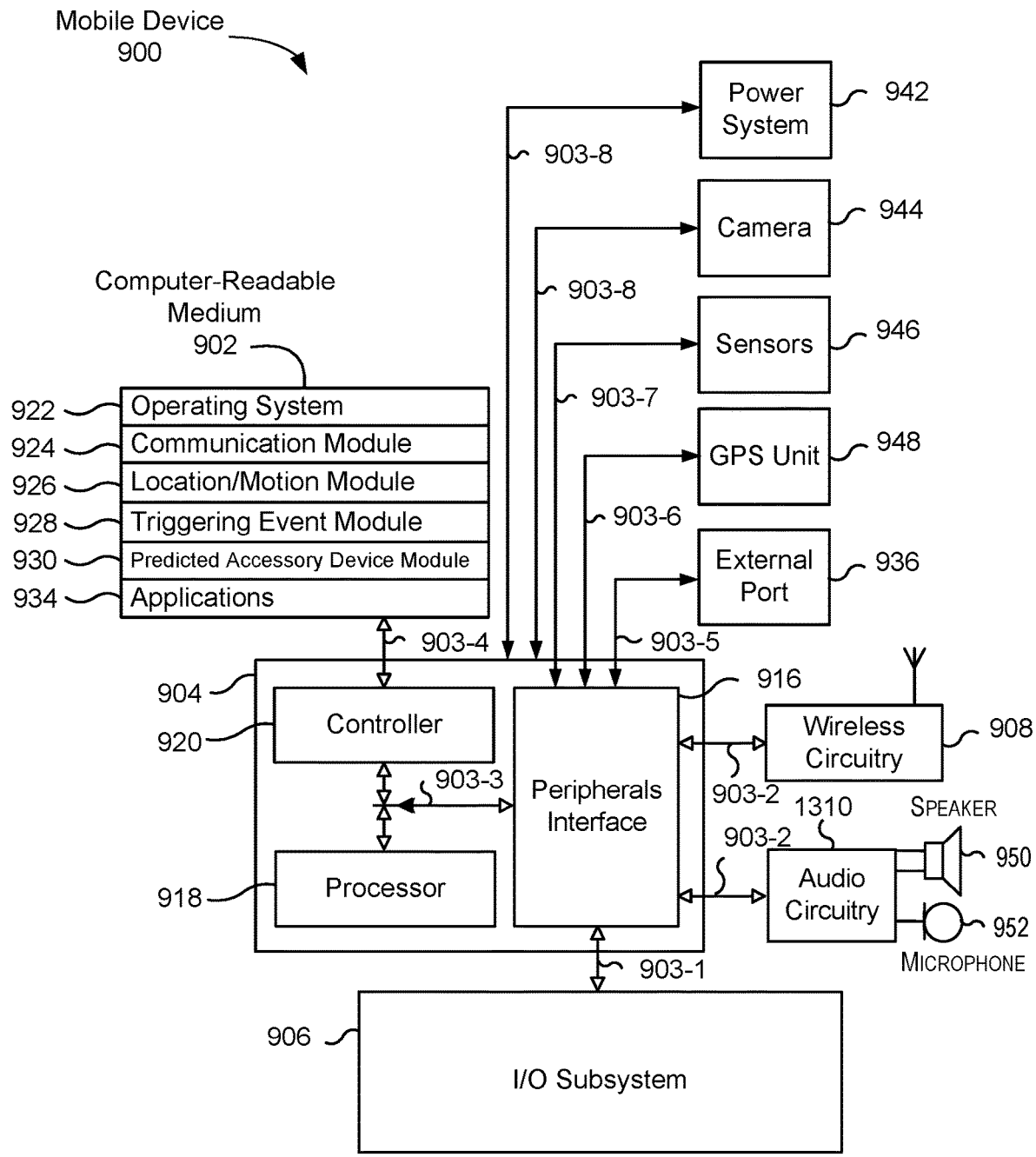
FIG. 9 illustrates a block diagram of an example device, in accordance with some embodiments.

FIG. 9 is a block diagram of an example device 900, which may be a mobile device, in accordance with some embodiments. Device 900 generally includes computer-readable medium 902, a processing system 904, an Input/Output (I/O) subsystem 906, wireless circuitry 908, and audio circuitry 910 including speaker 950 and microphone 952. These components may be coupled by one or more communication buses or signal lines 903. Device 900 can be any portable electronic device, including a handheld computer, a tablet computer, a mobile phone, laptop computer, tablet device, media player, personal digital assistant (PDA), a key fob, a car key, an access card, a multi-function device, a mobile phone, a portable gaming device, a car display unit, or the like, including a combination of two or more of these items.

It should be apparent that the architecture shown in FIG. 9 is only one example of an architecture for device 900, and that device 900 can have more or fewer components than shown, or a different configuration of components. The various components shown in FIG. 9 can be implemented in hardware, software, or a combination of both hardware and software, including one or more signal processing and/or application specific integrated circuits.

Wireless circuitry 908 is used to send and receive information over a wireless link or network to one or more other devices' conventional circuitry such as an antenna system, an RF transceiver, one or more amplifiers, a tuner, one or more oscillators, a digital signal processor, a CODEC chipset, memory, etc. Wireless circuitry 908 can use various protocols, e.g., as described herein.

Wireless circuitry 908 is coupled to processing system 904 via peripherals interface 916. Interface 916 can include conventional components for establishing and maintaining communication between peripherals and processing system 904. Voice and data information received by wireless circuitry 908 (e.g., in speech recognition or voice command applications) is sent to one or more processors 918 via peripherals interface 916. One or more processors 918 are configurable to process various data formats for one or more application programs 934 stored on medium 902.

Peripherals interface 916 couple the input and output peripherals of the device to processor 918 and computer-readable medium 902. One or more processors 918 communicate with computer-readable medium 902 via a controller 920. Computer-readable medium 902 can be any device or medium that can store code and/or data for use by one or more processors 918. Medium 902 can include a memory hierarchy, including cache, main memory and secondary memory.

Device 900 also includes a power system 942 for powering the various hardware components. Power system 942 can include a power management system, one or more power sources (e.g., battery, alternating current (AC)), a recharging system, a power failure detection circuit, a power converter or inverter, a power status indicator (e.g., a light emitting diode (LED)) and any other components typically associated with the generation, management and distribution of power in mobile devices.

In some embodiments, device 900 includes a camera 944. In some embodiments, device 900 includes sensors 946. Sensors can include accelerometers, compass, gyrometer, pressure sensors, audio sensors, light sensors, barometers, and the like. Sensors 946 can be used to sense location aspects, such as auditory or light signatures of a location.

In some embodiments, device 900 can include a GPS receiver, Global Navigation Satellite System (GLONASS), BeiDou, Galileo and other combinations of devices, sometimes referred to as a GPS unit 948. A mobile device can use a satellite navigation system, such as the Global Positioning System (GPS), to obtain position information, timing information, altitude, or other navigation information. During operation, the GPS unit can receive signals from GPS satellites orbiting the Earth. The GPS unit analyzes the signals to make a transit time and distance estimation. The GPS unit can determine the current position (current location) of the mobile device. Based on these estimations, the mobile device can determine a location fix, altitude, and/or current speed. A location fix can be geographical coordinates such as latitudinal and longitudinal information.

One or more processors 918 run various software components stored in medium 902 to perform various functions for device 900. In some embodiments, the software components include an operating system 922, a communication module (or set of instructions) 924, a location module (or set of instructions) 926, a triggering event module 928, a predicted accessory device module 930, and other applications (or set of instructions) 934, such as a car locator app and a navigation app.

Operating system 922 can be any suitable operating system, including iOS, Mac OS, Darwin, RTXC, LINUX, UNIX, OS X, WINDOWS, or an embedded operating system such as VxWorks. The operating system can include various procedures, sets of instructions, software components and/or drivers for controlling and managing general system tasks (e.g., memory management, storage device control, power management, etc.) and facilitates communication between various hardware and software components.

Communication module 924 facilitates communication with other devices over one or more external ports 936 or via wireless circuitry 908 and includes various software components for handling data received from wireless circuitry 908 and/or external port 936. External port 936 (e.g., USB, FireWire, Lightning connector, 60-pin connector, etc.) is adapted for coupling directly to other devices or indirectly over a network (e.g., the Internet, wireless LAN, etc.).

Location/motion module 926 can assist in determining the current position (e.g., coordinates or other geographic location identifier) and motion of device 900. Modern positioning systems include satellite based positioning systems, such as Global Positioning System (GPS), cellular network positioning based on "cell IDs," and Wi-Fi positioning technology based on a Wi-Fi networks. GPS also relies on the visibility of multiple satellites to determine a position estimate, which may not be visible (or have weak signals) indoors or in "urban canyons." In some embodiments, location/motion module 926 receives data from GPS unit 948 and analyzes the signals to determine the current position of the mobile device. In some embodiments, location/motion module 926 can determine a current location using Wi-Fi or cellular location technology. For example, the location of the mobile device can be estimated using knowledge of nearby cell sites and/or Wi-Fi access points with knowledge also of their locations. Information identifying the Wi-Fi or cellular transmitter is received at wireless circuitry 908 and is passed to location/motion module 926. In some embodiments, the location module receives the one or more transmitter IDs. In some embodiments, a sequence of transmitter IDs can be compared with a reference database (e.g., Cell ID database, Wi-Fi reference database) that maps or correlates the transmitter IDs to position coordinates of corresponding transmitters, and computes estimated position coordinates for device 900 based on the position coordinates of the corresponding transmitters. Regardless of the specific location technology used, location/motion module 926 receives information from which a location fix can be derived, interprets that information, and returns location information, such as geographic coordinates, latitude/longitude, or other location fix data.

Triggering event module 928 can include various sub-modules or systems. Furthermore, prediction module 930 can include various sub-modules or systems, e.g., as described herein with respect to FIG. 3.

The one or more applications 934 on the mobile device can include any applications installed on the device 900, including without limitation, a browser, address book, contact list, email, instant messaging, word processing, keyboard emulation, widgets, JAVA-enabled applications, encryption, digital rights management, voice recognition, voice replication, a music player (which plays back recorded music stored in one or more files, such as MP3 or AAC files), etc.

There may be other modules or sets of instructions (not shown), such as a graphics module, a time module, etc. For example, the graphics module can include various conventional software components for rendering, animating and displaying graphical objects (including without limitation text, web pages, icons, digital images, animations and the like) on a display surface. In another example, a timer module can be a software timer. The timer module can also be implemented in hardware. The time module can maintain various timers for any number of events.

The I/O subsystem 906 can be coupled to a display system (not shown), which can be a touch-sensitive display. The display displays visual output to the user in a GUI. The visual output can include text, graphics, video, and any combination thereof. Some or all of the visual output can correspond to user-interface objects. A display can use LED (light emitting diode), LCD (liquid crystal display) technology, or LPD (light emitting polymer display) technology, although other display technologies can be used in other embodiments.

In some embodiments, I/O subsystem 906 can include a display and user input devices such as a keyboard, mouse, and/or track pad. In some embodiments, I/O subsystem 906 can include a touch-sensitive display. A touch-sensitive display can also accept input from the user based on haptic and/or tactile contact. In some embodiments, a touch-sensitive display forms a touch-sensitive surface that accepts user input. The touch-sensitive display/surface (along with any associated modules and/or sets of instructions in medium 902) detects contact (and any movement or release of the contact) on the touch-sensitive display and converts the detected contact into interaction with user-interface objects, such as one or more soft keys, that are displayed on the touch screen when the contact occurs. In some embodiments, a point of contact between the touch-sensitive display and the user corresponds to one or more digits of the user. The user can make contact with the touch-sensitive display using any suitable object or appendage, such as a stylus, pen, finger, and so forth. A touch-sensitive display surface can detect contact and any movement or release thereof using any suitable touch sensitivity technologies, including capacitive, resistive, infrared, and surface acoustic wave technologies, as well as other proximity sensor arrays or other elements for determining one or more points of contact with the touch-sensitive display.

Further, the I/O subsystem can be coupled to one or more other physical control devices (not shown), such as push-buttons, keys, switches, rocker buttons, dials, slider switches, sticks, LEDs, etc., for controlling or performing various functions, such as power control, speaker volume control, ring tone loudness, keyboard input, scrolling, hold, menu, screen lock, clearing and ending communications and the like. In some embodiments, in addition to the touch screen, device 900 can include a touchpad (not shown) for activating or deactivating particular functions. In some embodiments, the touchpad is a touch-sensitive area of the device that, unlike the touch screen, does not display visual output. The touchpad can be a touch-sensitive surface that is separate from the touch-sensitive display or an extension of the touch-sensitive surface formed by the touch-sensitive display.

In some embodiments, some or all of the operations described herein can be performed using an application executing on the user's device. Circuits, logic modules, processors, and/or other components may be configured to perform various operations described herein. Those skilled in the art will appreciate that, depending on implementation, such configuration can be accomplished through design, setup, interconnection, and/or programming of the particular components and that, again depending on implementation, a configured component might or might not be reconfigurable for a different operation. For example, a programmable processor can be configured by providing suitable executable code; a dedicated logic circuit can be configured by suitably connecting logic gates and other circuit elements; and so on.

Any of the software components or functions described in this application may be implemented as software code to be executed by a processor using any suitable computer language such as, for example, Java, C, C++, C#, Objective-C, Swift, or scripting language such as Perl or Python using, for example, conventional or object-oriented techniques. The software code may be stored as a series of instructions or commands on a computer readable medium for storage and/or transmission. A suitable non-transitory computer readable medium can include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Computer programs incorporating various features of the embodiments may be encoded on various computer readable storage media; suitable media include magnetic disk or tape, optical storage media such as compact disk (CD) or DVD (digital versatile disk), flash memory, and the like. Computer readable storage media encoded with the program code may be packaged with a compatible device or provided separately from other devices. In addition program code may be encoded and transmitted via wired optical, and/or wireless networks conforming to a variety of protocols, including the Internet, thereby allowing distribution, e.g., via Internet download. Any such computer readable medium may reside on or within a single computer product (e.g. a solid state drive, a hard drive, a CD, or an entire computer system), and may be present on or within different computer products within a system or network. A computer system may include a monitor, printer, or other suitable display for providing any of the results mentioned herein to a user.

Although the invention has been described with respect to specific embodiments, it will be appreciated that the invention is intended to cover all modifications and equivalents within the scope of the following claims.

What is claimed is:

1. A method of controlling one or more accessory devices controlled by an application executing on a mobile device, the method comprising:
   measuring, by the mobile device, one or more sensor values to determine a data point at each of a plurality of first times, the one or more sensor values measured using one or more sensors of the mobile device, wherein the one or more sensor values are determined from one or more signals emitted by corresponding one or more accessory devices, wherein the sensor values are received from accessory devices in a plurality of different locations;
   clustering, by the mobile device, data points within a threshold distance of each other to create a plurality of clusters;
   associating, by the mobile device, a first cluster of the plurality of clusters to a first location of a plurality of locations;
   associating, by the mobile device, a first accessory device of the one or more accessory devices with the first location based on the one or more signals emitted by the first accessory device for the first cluster; and
   providing, by the mobile device, a message using the application, the message for controlling the first accessory device of the one or more accessory devices.

2. The method according to claim 1, further comprising:
   after associating the one or more accessory devices with the first location, measuring, using the one or more accessory devices, one or more sensor values to determine a current condition of the first location; and
   identifying, by the one or more accessory devices, the current condition of the first location, wherein the current condition indicates a spatial position of the first location in a space.

3. The method according to claim 2, further comprising:
   receiving, by the mobile device, the identified current condition of the first location from the one or more accessory devices in the first location; and
   wherein the message is provided in accordance with the identified current condition of the first location.

4. The method according to claim 2, wherein the current condition comprises one from a group consisting of a lighting condition, a weather condition and a temperature condition.

5. The method according to claim 1, wherein the controlling the first accessory device of the one or more accessory devices associated with the first location comprises automatically operating, by the mobile device, the first accessory device of the one or more accessory devices.

6. The method according to claim 1, wherein the controlling the first accessory device of the one or more accessory devices associated with the first location comprises automatically operating, by the mobile device, the first accessory device of the one or more accessory devices to perform an operation.

7. The method according to claim 3, wherein the first accessory device is automatically operated in accordance with a user profile associated with the first accessory device.

8. The method according to claim 3, wherein the first accessory device is automatically operated based one or more external conditions.

9. The method according to claim 3, wherein the first accessory device is further controlled based on machine learned interactions of a user and the first accessory device.

10. The method according to claim 1, wherein the one or more sensor values are obtained from the one or more sensors comprising a temperature sensor, a weather sensor, and a light sensor.

11. The method according to claim 1, wherein the first location corresponds to one or more rooms.

12. The method according to claim 1, wherein the one or more signals emitted by the one or more accessory devices comprises signal properties indicative of a distance between the mobile device and a point of origin of the one or more accessory devices.

13. A non-transitory computer readable medium storing a plurality of instructions executed on a mobile device including one or more processors, the instructions comprising:
   measuring, by the mobile device, one or more sensor values to determine a data point at each of a plurality of first times, the one or more sensor values measured using one or more sensors of the mobile device, wherein the one or more sensor values are determined from one or more signals emitted by corresponding one or more accessory devices, wherein the sensor values are received from accessory devices in a plurality of different locations;
   clustering, by the mobile device, data points within a threshold distance of each other to create a plurality of clusters;
   associating, by the mobile device, a first cluster of the plurality of clusters to a first location of a plurality of locations;
   associating, by the mobile device, a first accessory device of the one or more accessory devices with the first location based on the one or more signals emitted by the first accessory device for the first cluster; and providing, by the mobile device, a message using an application executing on the mobile device, the message for controlling the first accessory device of the one or more accessory devices.

14. The computer readable medium according to claim 13, further comprising:

after associating the one or more accessory devices with the first location, measuring, using the one or more accessory devices, one or more sensor values to determine a current condition of the first location; and identifying, by the one or more accessory devices, the current condition of the first location, wherein the current condition indicates a spatial position of the first location in a space.

15. The computer readable medium according to claim 14, the instructions further comprising:

receiving, by the mobile device, the identified current condition of the first location from the one or more accessory devices in the first location; and wherein the message is provided in accordance with the identified current condition of the first location.

16. The computer readable medium according to claim 13, wherein the controlling the first accessory device of the one or more accessory devices associated with the first location comprises automatically operating, by the mobile device, the first accessory device of the one or more accessory devices.

17. A mobile device comprising:

a database for storing sensor values of a data point; and one or more processors configured to:

measure, by the mobile device, one or more sensor values to determine a data point at each of a plurality of first times, the one or more sensor values measured using one or more sensors of the mobile device, wherein the one or more sensor values are determined from one or more signals emitted by corresponding one or more accessory devices, wherein the sensor values are received from accessory devices in a plurality of different locations;

cluster, by the mobile device, data points within a threshold distance of each other to create a plurality of clusters;

associate, by the mobile device, a first cluster of the plurality of clusters to a first location of a plurality of locations;

associate, by the mobile device, a first accessory device of the one or more accessory devices with the first location based on the one or more signals emitted by the first accessory device for the first cluster; and provide, by the mobile device, a message using an application executing on the mobile device, the message for controlling the first accessory device of the one or more accessory devices.

18. The mobile device according to claim 17, further comprising one or more processors configured to:

after associating the one or more accessory devices with the first location, measuring, using the one or more accessory devices, one or more sensor values to determine a current condition of the first location; and identifying, by the one or more accessory devices, the current condition of the first location, wherein the current condition indicates a spatial position of the first location in a space.

19. The mobile device according to claim 18, further comprising one or more processors configured to:

receiving, by the mobile device, the identified current condition of the first location from the one or more accessory devices in the first location; and wherein the message is provided in accordance with the identified current condition of the first location.

20. The mobile device according to claim 17, wherein the controlling the first accessory device of the one or more accessory devices associated with the first location comprises automatically operating, by the mobile device, the first accessory device of the one or more accessory devices.

* * * * *